(12) United States Patent
Kanagawa et al.

(10) Patent No.: US 9,404,017 B2
(45) Date of Patent: Aug. 2, 2016

(54) ACTIVE-ENERGY-RAY-CURABLE HOT-MELT URETHANE RESIN COMPOSITION, MEMBER FOR ELECTRONIC DEVICE, THE MEMBER INCLUDING THE RESIN COMPOSITION, AND PACKING

(75) Inventors: Yoshinori Kanagawa, Osaka (JP); Daichi Higuchi, Osaka (JP); Tamotsu Sakamoto, Osaka (JP)

(73) Assignee: DIC CORPORATION, Tokyo (JP)

( * ) Notice: Subject to any disclaimer, the term of this patent is extended or adjusted under 35 U.S.C. 154(b) by 202 days.

(21) Appl. No.: 13/704,450

(22) PCT Filed: Aug. 3, 2011

(86) PCT No.: PCT/JP2011/067762
§ 371 (c)(1),
(2), (4) Date: Feb. 27, 2013

(87) PCT Pub. No.: WO2012/032885
PCT Pub. Date: Mar. 15, 2012

(65) Prior Publication Data
US 2013/0158149 A1   Jun. 20, 2013

(30) Foreign Application Priority Data

Sep. 6, 2010  (JP) .................................. 2010-198793

(51) Int. Cl.
| | |
|---|---|
| *C09D 175/04* | (2006.01) |
| *F16J 15/14* | (2006.01) |
| *C08F 299/06* | (2006.01) |
| *C08G 18/48* | (2006.01) |
| *C08G 18/67* | (2006.01) |
| *C08G 18/76* | (2006.01) |
| *C08G 18/40* | (2006.01) |
| *C08G 18/42* | (2006.01) |
| *C09J 175/16* | (2006.01) |

(52) U.S. Cl.
CPC ............ *C09D 175/04* (2013.01); *C08F 299/06* (2013.01); *C08G 18/4018* (2013.01); *C08G 18/4211* (2013.01); *C08G 18/4854* (2013.01); *C08G 18/672* (2013.01); *C08G 18/7642* (2013.01); *C09J 175/16* (2013.01); *F16J 15/14* (2013.01); *C08G 2170/20* (2013.01)

(58) Field of Classification Search
CPC ................................................... C09D 175/04
See application file for complete search history.

(56) References Cited

U.S. PATENT DOCUMENTS

| 4,284,731 | A  | * | 8/1981  | Moser et al. ................... 525/28 |
|---|---|---|---|---|
| 4,999,407 | A  |   | 3/1991  | Gilch et al. |
| 5,173,538 | A  |   | 12/1992 | Gilch et al. |
| 6,767,980 | B2 | * | 7/2004  | Yurugi et al. ................. 526/320 |
| 6,794,422 | B1 | * | 9/2004  | Bruchmann et al. ........... 522/90 |
| 6,995,194 | B2 | * | 2/2006  | Moens et al. ................. 522/111 |
| 2009/0238984 | A1 | * | 9/2009  | Tomita et al. ............ 427/428.01 |
| 2011/0123929 | A1 | * | 5/2011  | Fujita et al. ................. 430/281.1 |
| 2011/0287242 | A1 | * | 11/2011 | Kanagawa et al. ........... 428/220 |
| 2012/0250268 | A1 | * | 10/2012 | Ito et al. ....................... 361/748 |

FOREIGN PATENT DOCUMENTS

| JP | 2-016180 A | | 1/1990 |
|---|---|---|---|
| JP | 2-050378 A | | 2/1990 |
| JP | 2-182774 A | | 7/1990 |
| JP | 8-291467 A | | 11/1996 |
| JP | 2008-063406 A | | 3/2008 |
| JP | 2008-063407 A | | 3/2008 |
| JP | 2009-096839 A | | 5/2009 |
| WO | 99/51653 A1 | | 10/1999 |
| WO | WO 2008/090640 | * | 7/2008 |
| WO | WO 2009/107301 A1 | * | 9/2009 |
| WO | WO 2011/074528 | * | 6/2011 |

OTHER PUBLICATIONS

International Search Report for PCT/JP2011/067762, mailing date of Nov. 22, 2011.

* cited by examiner

*Primary Examiner* — Jeffrey Washville
(74) *Attorney, Agent, or Firm* — Westerman, Hattori, Daniels & Adrian, LLP

(57) ABSTRACT

An active-energy-ray-curable hot-melt urethane resin composition contains a hot-melt urethane and an active energy ray polymerization initiator, the hot-melt urethane being obtained by converting more than 50% and 100% or less of the total number of isocyanate groups in an isocyanate group-terminated urethane prepolymer into terminal (meth)acryloyl groups by a reaction with hydroxyl groups in a reactive functional group-containing (meth)acrylic compound, the isocyanate group-terminated urethane prepolymer being obtained by reacting a polyisocyanate component with a polyol component that contains an aromatic polyester polyol containing a 2,2-dimethyl-1,3-propylene structure in its molecule in an amount of 90% by mole or more of a glycol component and a polyol other than the aromatic polyester polyol. The hot-melt urethane resin composition has excellent properties such as hot melting, rapid curability, a shape-retaining property after being applied, flexibility, durability, a property of adhering to a base, a low outgas property, mechanical strength, and flame retardancy.

9 Claims, No Drawings

ACTIVE-ENERGY-RAY-CURABLE HOT-MELT URETHANE RESIN COMPOSITION, MEMBER FOR ELECTRONIC DEVICE, THE MEMBER INCLUDING THE RESIN COMPOSITION, AND PACKING

TECHNICAL FIELD

The present invention relates to an active-energy-ray-curable hot-melt urethane resin composition, a member for an electronic device, the member including the resin composition, and packing. More specifically, the present invention relates to an active-energy-ray-curable hot-melt urethane resin composition that has two properties, namely, a hot-melt property of solidification by cooling after application being fast and rapid curability upon irradiation with active energy rays such as ultraviolet rays, electron beams, X-rays, infrared rays, or visible rays, a member for an electronic device, the member including the resin composition, and packing. The active-energy-ray-curable hot-melt urethane resin composition, the member for an electronic device, and the packing have excellent properties such as a shape-retaining property after being applied onto a base, flexibility, durability (in particular, hydrolysis resistance), a property of adhering to a base (in particular, a property of adhering to a metal) (including a reworking property), a low outgas property, mechanical strength, and flame retardancy.

BACKGROUND ART

Recently, in magnetic disk devices, considerable progress has been made with regard to increasing capacity, providing high-speed operation, and reducing size, and the importance of such magnetic disk devices has been increasing as economical memory devices for computers.

A magnetic disk drive used in such a magnetic disk device is fixed in a sealed structure with packing for a hard disk drive (hereinafter abbreviated as "HDD packing"). The sealed structure prevents dust and contamination from entering, prevents malfunction and failure due to vibration, realizes high-density recording, a compact size, and size reduction, and ensures high reliability, etc.

Furthermore, HDD packing requires, as a function of packing, excellent properties such as flexibility, durability (in particular, hydrolysis resistance), a property of adhering to a base (in particular, a property of adhering to a metal), a low outgas property, and a mechanical strength besides a shape-retaining property after being applied onto a base.

Hitherto, for the purpose of preventing dust and contamination from entering and preventing failure due to vibration, a sealing member (i.e., packing) has been provided between a housing of a magnetic disk drive and the housing. For example, a porous material having elasticity, such as sponge or cork having a strip shape has been used.

However, in this method, such a strip-shaped porous material is bonded to a peripheral portion that contacts a cover of the housing with an adhesive by hand. Thus, the method requires a skilled operator and a large amount of labor, and therefore, is not suitable for mass production. In addition, this method essentially includes at least two steps of applying an adhesive and bonding a porous material such as sponge, and thus is complex and very inefficient. Furthermore, the housing is produced by molding a plastic. Therefore, when a thermosetting adhesive is used as the adhesive, the housing is deformed by heat, which is a serious problem in terms of production control.

To address this problem, recently, in the assembly and production of a magnetic disk drive and components thereof, an active-energy-ray-curable resin composition such as an ultraviolet-curable resin composition has been used for fixing and joining the components in order to meet requirements such as a reduction in work time and a reduction in cost which has been achieved by omitting a heating step.

For example, according to a known method for providing a sealing member on a housing for a magnetic disk drive, an ultraviolet-curable resin composition having elasticity is used as a sealing member provided between a housing for a magnetic disk drive and a cover of the housing, and the periphery of a surface that contacts the cover of the housing for the magnetic disk drive is coated with the ultraviolet-curable resin composition using a nozzle, and is then irradiated with ultraviolet rays to cure the coating (refer to, for example, PTL 1).

According to this method, an ultraviolet-curable resin composition is applied with a nozzle, and the resulting coating is then irradiated with ultraviolet rays to cure the coating, thus forming a sealing member having elasticity. Thus, dust and contamination can be prevented from entering and vibration can be prevented, and the sealing member can be easily and rapidly formed. Furthermore, since the ultraviolet-curable resin composition is applied with a nozzle, the thickness and the width of the sealing member can be adjusted to desired values.

However, the ultraviolet-curable resin composition used in PTL 1 generates a large amount of outgas due to a residual monomer after curing with ultraviolet rays. Accordingly, there may be a problem in that, for example, malfunction and failure tend to occur during recording and reading of a signal.

Therefore, in order to reduce a residual monomer, which is the main cause of the generation of outgas, heat treatment is usually conducted in advance under a high-temperature condition for a long time in preparation of a resin composition. However, this method has only a slight effect of reducing outgas and is not effective. This method has problems such as degradation and discoloration of the resin due to long-term heat treatment, and extremely poor productivity because this method requires labor and processing time.

A known method of producing a photo-curable sealing agent includes mixing, as essential components, at least one bifunctional (meth)acrylate represented by general formula (1) below:

[Chem. 1]

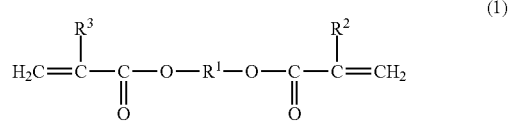

(wherein $R^1$ is a divalent aliphatic hydrocarbon group, whose main chain has 3 to 15 carbon atoms, and $R^2$ and $R^3$ each independently are a hydrogen atom or a methyl group), (B) at least one monofunctional (meth)acrylate represented by general formula (2):

[Chem. 2]

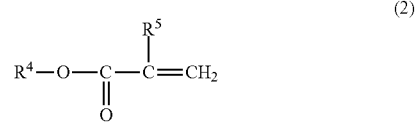

(wherein $R^4$ is an alkyl group having 6 to 20 carbon atoms and $R^5$ is a hydrogen atom or a methyl group), (C) a styrene-isobutylene block copolymer, (D) a photoinitiator, and (E) a silica powder (refer to, for example, PTL 2).

It is described that the photo-curable sealing agent obtained by the above production method has good moisture permeation resistance and elasticity, and thus is useful as sealing of an electronic component casing that includes an electronic circuit element and an electronic component such as a hard disk therein, and a moisture-permeation-resistant sealing agent in other components that require moisture permeation resistance.

However, the photo-curable sealing agent described in PTL 2 also generates a large amount of outgas due to a residual monomer after curing by irradiation of ultraviolet rays as in the case of PTL 1. Accordingly, there may be a problem in that, for example, malfunction and failure tend to occur during recording and reading of a signal.

Furthermore, the following ultraviolet-curable composition for assembling a hard disk device is known: In the ultraviolet-curable composition used in the assembly of components of a hard disk device, a curable component of the ultraviolet-curable composition is a urethane (meth)acrylate obtained by an addition reaction between a hydroxyl group in a hydroxyalkyl (meth)acrylate and an isocyanate group in an isocyanate oligomer using either an organozinc compound or an amine compound as a catalyst, the isocyanate oligomer being prepared using an organozinc compound or an amine compound as a catalyst of an addition reaction between an isocyanate group and active hydrogen (refer to, for example, PTL 3).

It is described that this ultraviolet-curable composition does not contain a tin compound and does not contain an outgas component, and thus can be used for fixing or joining of hard disk device components etc. (e.g., packing of a housing case of a hard disk device, a cap seal of a spindle motor, fixing of a magnetic head, and fixing between a substrate and a connector).

However, the ultraviolet-curable composition obtained in PTL 3 has the following problems: (1) It is essential to conduct a curing process by irradiation of active energy rays for the purpose of ensuring a shape-retaining property. (2) Since the amount of a low-molecular weight prepolymer and the amount of residual monomer (e.g., diphenylmethane diisocyanate (MDI)) are large, the cross-linking density increases and the resulting cured product becomes excessively hard. (3) Since the amount of residual monomer after curing is large, a disk reading failure due to the generation of outgas tends to occur.

In addition, for example, acrylate compounds of oligomers have also been studied as resins used in active-energy-ray-curable resin compositions. However, regarding a reduction in the amount of outgas generated, satisfactory results have not been obtained.

As resins used as HDD packing, in addition to active-energy-ray-curable resins, various materials such as a rubber elastomer and polyurethane resin foam with an adhesive have also been studied. However, the amount of outgas generated from a formed product of all the materials is large. Accordingly, malfunction and failure frequently occur during recording and reading of a signal. Thus, the problem has not been solved. As a countermeasure for the problem, for example, degassing is performed by conducting heat treatment under a high-temperature condition in advance. However, this method has extremely low productivity, and a sufficient effect of reducing outgas cannot be achieved by this method.

Furthermore, recently, with the increase in the storage capacity of hard disks, the improvement in the accuracy of hard disks, and a marked increase in information processing speed, there has been a concern that a serious problem may occur in, for example, a hard disk drive having a large storage capacity even in the case where a very small amount of an outgas component adheres to a surface of a magnetic disk at a level that has not been hitherto considered as a cause of malfunction and failure.

As described above, when a very small amount of dust or contamination is mixed in a hard disk drive and adheres to a surface of a magnetic disk in the assembly and production, malfunction and failure may frequently occur during recording and reading of a signal. Therefore, regarding an active-energy-ray-curable resin composition such as an ultraviolet-curable resin composition used in the assembly of a hard disk drive, use of a resin composition in which the amount of outgas generated is small has also been strongly desired.

In a hard disk drive, a disk installed therein is rotated at a high speed, and thus components of the hard disk drive are joined and fixed to each other with a rubber-like elastic body capable of absorbing vibration that generates in the high-speed rotary movement. For this purpose, resins containing, as a main raw material, a urethane acrylate compound that forms a cured product having relatively high flexibility are generally used as active-energy-ray-curable resins used in joining and fixing such components.

However, urethane (meth)acrylate compounds that are generally used contain an organotin compound as a catalyst, and thus outgas components due to a residual monomer after curing is easily generated. The outgas components adhere to a disk surface, which tends to induce malfunction and failure during recording and reading of a signal. Hitherto, these malfunction and failure have often caused problems.

Adhesives that use an organic solvent, the adhesives having been hitherto used, have problems in terms of being hazardous to workers, risk of fire, environmental pollution, low drying rate, consumption of solvents, etc. Therefore, reactive hot-melt urethane adhesives have been actively studied as energy-saving environmentally friendly adhesives that are free of solvent and that do not require solvent recovery. Such reactive hot-melt urethane adhesives have been used as high-value-added products instead of existing solvent-based resins and water-based resins in wide applications, for example, adhesives for building materials and fibers, and coating agents.

The reactive hot-melt urethane adhesives have both a "hot-melt property" and a "moisture-curing property" and have been attracting as solvent-free adhesives in various fields. The "hot-melt property" is a property that the adhesive is solid at room temperature, the adhesive melts and becomes liquid or exhibits a viscous property when heat is applied thereto, and a cohesive force is again exhibited by cooling. The "moisture-curing property" is a property that adhesiveness is obtained by a cross-linking structure formed by a reaction between moisture (water) in air and an isocyanate group. Note that, in the present invention, moisture (water) and water vapor are treated as being the same.

A typical known example of such a reactive hot-melt urethane adhesive is an adhesive containing an isocyanate group-terminated urethane prepolymer.

However, in the case where such a reactive hot-melt urethane adhesive is used in the assembly and production of members for electronic devices, problems in terms of production control and quality control occur. Specifically, since the speed of a production line is high, a problem that the members are transferred to the next step while insufficiently joined and fixed by the reactive hot-melt urethane adhesive frequently occurs. In addition, there may also be a problem that, in general, a reactive hot-melt urethane adhesive is poor in terms of heat-resistant shape-retaining property because it is necessary to keep the adhesive in a molten state during application under heating.

As described above, there still remain problems in terms of properties such as a shape-retaining property after being applied onto a base, flexibility, durability (in particular, hydrolysis resistance), a property of adhering to a base (in particular, a property of adhering to a metal), a low outgas property, mechanical strength, and flame retardancy in the related art. Accordingly, an active-energy-ray-curable hot-melt urethane resin composition having balanced properties, a member for an electronic device and packing, the member and packing including the resin composition, have been strongly desired.

CITATION LIST

Patent Literature

PTL 1: Japanese Unexamined Patent Application Publication No. 2-50378
PTL 2: Japanese Unexamined Patent Application Publication No. 2009-96839
PTL 3: International Publication No. WO99/51653

SUMMARY OF INVENTION

Technical Problem

An object of the present invention is to provide an active-energy-ray-curable hot-melt urethane resin composition that has two properties, namely, a hot-melt property of solidification by cooling after application being fast and rapid curability upon irradiation with active energy rays (such as ultraviolet rays, electron beams, X-rays, infrared rays, or visible rays), and that is excellent in terms of a shape-retaining property after being applied onto a base, flexibility, durability (in particular, hydrolysis resistance), a property of adhering to a base (in particular, a property of adhering to a metal), a low outgas property, mechanical strength, and flame retardancy, a member for an electronic device and packing, the member and packing including the resin composition.

Solution to Problem

The inventors of the present invention have conducted intensive studies in order to solve the above problem. As a result, it was found that an active-energy-ray-curable hot-melt urethane resin composition containing a hot-melt urethane and an active energy ray polymerization initiator, the hot-melt urethane being obtained by converting more than 50% and 100% or less of the total number of isocyanate groups in an isocyanate group-terminated urethane prepolymer into terminal (meth)acryloyl groups by a reaction with hydroxyl groups in a reactive functional group-containing (meth)acrylic compound, the isocyanate group-terminated urethane prepolymer being obtained by reacting a polyisocyanate component with a polyol component that contains an aromatic polyester polyol containing a specific branched alkyl structure in its molecule in an amount of 90% by mole or more of a glycol component and a polyol other than the aromatic polyester polyol has two properties, namely, a hot-melt property of solidification by cooling after application being fast and rapid curability upon irradiation with active energy rays such as ultraviolet rays, and is excellent in terms of a shape-retaining property after being applied onto a base, flexibility, durability (in particular, hydrolysis resistance), a property of adhering to a base (in particular, a property of adhering to a metal), a low outgas property, and mechanical strength. This finding resulted in completion of the present invention.

Specifically, the present invention relates to an active-energy-ray-curable hot-melt urethane resin composition containing a hot-melt urethane (X) and an active energy ray polymerization initiator (Y), the hot-melt urethane (X) being obtained by converting more than 50% and 100% or less of the total number of isocyanate groups in an isocyanate group-terminated urethane prepolymer (C) into terminal (meth)acryloyl groups by a reaction with hydroxyl groups in a reactive functional group-containing (meth)acrylic compound (D), the isocyanate group-terminated urethane prepolymer (C) being obtained by reacting a polyisocyanate component (B) with a polyol component (A) that contains an aromatic polyester polyol (a1) containing, as a glycol having a 2,2-dimethyl-1,3-propylene structure in its molecule, neopentyl glycol in an amount of 90% by mole or more of a glycol component and a polyol (a2) other than the aromatic polyester polyol (a1).

The present invention relates to a member for an electronic device, the member being produced by forming the active-energy-ray-curable hot-melt urethane resin composition.

The present invention relates to packing produced by forming the active-energy-ray-curable hot-melt urethane resin composition.

Advantageous Effects of Invention

An active-energy-ray-curable hot-melt urethane resin composition of the present invention has two properties, namely, a hot-melt property of solidification by cooling after application being fast and rapid curability upon irradiation with active energy rays such as ultraviolet rays, electron beams, X-rays, infrared rays, or visible rays, and is excellent in terms of a shape-retaining property after being applied onto a base, flexibility, durability (in particular, hydrolysis resistance), a property of adhering to a base (in particular, a property of adhering to a metal), a low outgas property, mechanical strength, and flame retardancy. Accordingly, the active-energy-ray-curable hot-melt urethane resin composition of the present invention is useful in a wide range of applications, for example, not only members for an electronic device, such as packing (various types of packing, e.g., packing for an electronic device, packing for an industrial member, packing for a hard disk drive, and packing for a housing case), cap sealing members, and fixing members (for example, a fixing member for a magnetic head and a fixing member between a substrate and a connector) but also sealing members, films, sheets, packing for industrial use, ribbons, adhesives (e.g., an adhesive for building materials and an adhesive for fibers), coating agents, and pressure-sensitive adhesives.

DESCRIPTION OF EMBODIMENTS

The present invention will now be described in detail.
An active-energy-ray-curable hot-melt urethane resin composition of the present invention contains a hot-melt urethane (X) and an active energy ray polymerization initiator (Y), the hot-melt urethane (X) being obtained by converting more than 50% and 100% or less of the total number of isocyanate groups in an isocyanate group-terminated urethane prepolymer (C) into terminal (meth)acryloyl groups by a reaction with hydroxyl groups in a reactive functional group-containing (meth)acrylic compound (D), the isocyanate group-terminated urethane prepolymer (C) being obtained by reacting a polyisocyanate component (B) with a polyol component (A).

The isocyanate group-terminated urethane prepolymer (C) (hereinafter referred to as "urethane prepolymer (C)") can be obtained by reacting a polyisocyanate component (B) with a polyol component (A) that contains, as essential components, an aromatic polyester polyol (a1) containing, as a glycol having a 2,2-dimethyl-1,3-propylene structure in its molecule, neopentyl glycol in an amount of 90% by mole or more of a glycol component (hereinafter referred to as "aromatic polyester polyol (a1)") and a polyol (a2) other than the aromatic polyester polyol (a1).

In the present invention, the aromatic polyester polyol (a1) is obtained by a condensation reaction between a glycol component and an aromatic dicarboxylic acid, and it is essential that the glycol component contain, as a glycol having a 2,2-dimethyl-1,3-propylene structure in its molecule, neopentyl glycol in an amount of 90% by mole or more of the glycol component.

When the aromatic polyester polyol (a1) contains, as a glycol having a 2,2-dimethyl-1,3-propylene structure in its molecule, neopentyl glycol in an amount of 90% by mole or more of the glycol component, an initial cohesive force of the resulting active-energy-ray-curable hot-melt urethane resin composition is improved to exhibit excellent properties such as a shape-retaining property after being applied onto a base and a mechanical strength. When the aromatic polyester polyol (a1) contains, as a glycol having a 2,2-dimethyl-1,3-propylene structure in its molecule, neopentyl glycol in an amount of less than 90% by mole of the glycol component, the initial cohesive force is decreased. Thus, the shape-retaining property after being applied onto a base is poor, and the object of the present invention cannot be achieved.

An example of the glycol having a 2,2-dimethyl-1,3-propylene structure in its molecule is neopentyl glycol (NPG). Glycols obtained by ring-opening polymerization of γ-butyrolactone, ε-caprolactone, or the like using the above glycol as an initiator may also be used.

In the synthesis of the aromatic polyester polyol (a1), other glycols may be used as the glycol component in combination with neopentyl glycol, which is the glycol having a 2,2-dimethyl-1,3-propylene structure in its molecule and is an essential component.

Examples of the other glycols include ethylene glycol, 1,2-propylene glycol, 1,3-propylene glycol, 1,3-butanediol, 1,4-butanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, and cyclohexane-1,4-dimethanol. Adducts obtained by adding an alkylene oxide to bisphenol A, bisphenol F, hydrogenated bisphenol A, hydrogenated bisphenol F, or the like may also be used. Polymers obtained by ring-opening polymerization of γ-butyrolactone, ε-caprolactone, or the like using a low-molecular-weight polyol as an initiator may also be used.

Examples of the aromatic dicarboxylic acid include phthalic acid, phthalic anhydride, isophthalic acid, and terephthalic acid. Among these aromatic dicarboxylic acids, phthalic acid and phthalic anhydride are preferable from the standpoint that a good initial cohesive force, shape-retaining property, and mechanical strength, and appropriate flexibility can be exhibited. Regarding the amount of use thereof, the dicarboxylic acid component preferably contains 90% by mole or more of phthalic acid or phthalic anhydride.

The number-average molecular weight (Mn) of the aromatic polyester polyol (a1) is preferably in the range of 500 to 5,000, and more preferably in the range of 500 to 3,000. When the Mn of the aromatic polyester polyol (a1) is in the above range, properties such as the shape-retaining property, coating workability, and the initial cohesive force are further improved. The Mn of the aromatic polyester polyol (a1) was measured under the conditions described below.

Next, the polyol (a2) used for adjusting the polyol component (A) will be described.

The polyol component (A) essentially contains the polyol (a2) other than the aromatic polyester polyol (a1) in addition to the aromatic polyester polyol (a1).

Examples of the polyol (a2) include polyether polyols, polycarbonate polyols, polyester polyols, and acrylic polyols. These polyols may be used alone or in combination of two or more polyols. Among these polyols, from the standpoint that good durability (in particular, hydrolysis resistance) is obtained and good flexibility is obtained even under the condition of a wide temperature range from a low temperature to a high temperature, polyether polyols are preferred. Among polyether polyols, polytetramethylene glycol (PTMG) is more preferred.

The Mn of the polyol (a2) is preferably in the range of 500 to 3,000, and more preferably in the range of 1,000 to 2,000. When the Mn of the polyol (a2) is in the above range, excellent properties such as excellent durability (in particular, hydrolysis resistance), flexibility, and mechanical strength can be obtained.

In existing urethane resin compositions, in general, polytetramethylene glycol (PTMG) is used as a polyol used in a urethane prepolymer in order to exhibit properties such as durability and flexibility. However, the use of only PTMG causes a problem in that the shape-retaining property after being applied onto a base is poor because of an insufficient initial cohesive force. To address this problem, the inventors of the present invention conducted various studies. As a result, it was found that excellent properties such as, in particular, the shape-retaining property after being applied onto a base, flexibility, and mechanical strength can be provided by using the polyol component (A) containing both the aromatic polyester polyol (a1) containing a 2,2-dimethyl-1,3-propylene structure in its molecule in an amount of 90% by mole or more of a glycol component and the polyol (a2) other than the aromatic polyester polyol (a1) (in particular, PTMG) for the purpose of further improving the initial cohesive force.

In the present invention, preferably, 20 to 70 parts by mass of the aromatic polyester polyol (a1) and 80 to 30 parts by mass of the polyol (a2) other than the aromatic polyester polyol (a1) are contained in 100 parts by mass of the total amount of the polyol component (A). More preferably, 20 to 50 parts by mass of the aromatic polyester polyol (a1) and 80 to 50 parts by mass of the polyol (a2) are contained in 100 parts by mass of the total amount of the polyol component (A). When the polyol component (A) contains the aromatic polyester polyol (a1) and the polyol (a2) in the above range, good properties such as a shape-retaining property after being applied onto a base, flexibility, and mechanical strength can be provided.

Next, the polyisocyanate component (B) used in the production of the urethane prepolymer (C) will be described below.

The polyisocyanate component (B) used in the present invention is not particularly limited, and known polyisocyanates can be used. Examples thereof include aromatic diisocyanates such as diphenylmethane diisocyanate (MDI; 4,4'-MDI, 2,4'-MDI, 2,2'-MDI, mixtures thereof, and crude MDI), carbodiimide-modified MDI (modified MDI), polymethylene polyphenyl polyisocyanate, carbodiimidized diphenylmethane polyisocyanate, xylene diisocyanate, tolylene diisocyanate (TDI, 2,4-TDI, 2,6-TDI, and mixtures thereof), xylylene diisocyanate (XDI), 1,5-naphthalene diisocyanate (NDI), tetramethyl xylene diisocyanate, and phenylene diisocyanate; aliphatic diisocyanates such as hexamethylene diisocyanate (HDI), dimer acid diisocyanate, norbornene diisocyanate, lysine diisocyanate, and tetramethyl xylylene diisocyanate; and alicyclic diisocyanates such as isophorone diisocyanate (IPDI), hydrogenated diphenylmethane diisocyanate (hydrogenated MDI), hydrogenated xylylene diisocyanate (hydrogenated XDI), cyclohexane diisocyanate, dicyclohexylmethane diisocyanate, and isophorone diisocyanate. Among these, MDI and XDI are preferable because each of these polyisocyanates has high reactivity with the polyol (A) and rapidly reacts with moisture (water). These may be used alone or in combination of two or more compounds.

In the present invention, the isocyanate group-terminated urethane prepolymer (C) is synthesized by reacting the polyol component (A) with the polyisocyanate component (B).

The urethane prepolymer (C) can be obtained by causing a reaction using a known method. The reaction method is not particularly limited. For example, the polyol component (A) containing the aromatic polyester polyol (a1) and the polyol (a2) other than the aromatic polyester polyol (a1) is charged in a reaction container, and moisture in the polyol component (A) is removed in advance by heating in a reduced pressure. Subsequently, a necessary amount of polyisocyanate component (B) is added to the polyol component (A) by an appropriate method, e.g., dropwise, separately, at one time, or continuously, and mixed with the polyol component (A). The resulting mixture is then allowed to react until the isocyanate group content (%) becomes substantially constant. Thus, the urethane prepolymer (C) is obtained.

In general, the urethane prepolymer (C) is produced without using a solvent. Alternatively, the reaction may be conducted in an organic solvent. In the case where the reaction is conducted in an organic solvent, it is necessary to select an organic solvent that does not inhibit the reaction. Examples of the organic solvent include, but are not particularly limited to, esters such as methyl acetate, ethyl acetate, propyl acetate, and butyl acetate; ketones such as acetone, methyl ethyl ketone, methyl butyl ketone, and cyclohexanone; ether esters such as methyl cellosolve acetate and butyl cellosolve acetate; aromatic hydrocarbon solvents such as toluene and xylene; and amides such as dimethylformamide and dimethylacetamide. These organic solvents may be used alone or in combination of two or more solvents. The amount of organic solvent used is not particularly limited as long as the organic solvent does not inhibit the reaction. The organic solvent used in the reaction needs to be removed during or after the reaction by an appropriate method such as heating under a reduced pressure.

Regarding the ratio of the polyisocyanate component (B) to the polyol component (A) used in producing the urethane prepolymer (C), the equivalence ratio of the isocyanate group in the polyisocyanate component (B) to the hydroxyl group in the polyol component (A) (hereinafter referred to as "[NCO/OH]") is preferably [NCO/OH]=1.1 to 5.0 and more preferably 1.5 to 3.0. When the ratio [NCO/OH] is in the above range, the resulting urethane prepolymer (C) has a melt viscosity suitable in terms of coating workability, and an active-energy-ray-curable hot-melt urethane resin composition having an excellent shape-retaining property due to solidification by cooling can be obtained.

The reaction conditions (such as the temperature and the time) in producing the urethane prepolymer (C) can be appropriately determined in consideration of conditions such as safety, the quality, and the cost, and are not particularly limited. For example, the reaction temperature is preferably in the range of 80° C. to 120° C., and the reaction time is preferably in the range of 1 to 5 hours.

In the present invention, a softening temperature of the urethane prepolymer (C) measured in accordance with Japan Industrial Standard (JIS) K 2207 is preferably in the range of 30° C. to 120° C., and more preferably in the range of 40° C. to 100° C. A softening temperature of the urethane prepolymer (C) in the above range is preferable because an excellent shape-retaining property after being applied onto a base is obtained.

Examples of a method for adjusting the softening temperature of the urethane prepolymer (C) to the appropriate temperature range include various methods such as (1) adjustment by the molecular weight (e.g., adjustment of the molar ratio between the polyol component and the polyisocyanate component, use of a polyol having a high molecular weight, or use of a high-molecular polymer), (2) adjustment by crystallinity of the ethylene chain of the polyester polyol, (3) adjustment by aromatic structures of the polyol component and the polyisocyanate component, and (4) adjustment by an urethane bond. These methods are not particularly limited and can be appropriately selected.

The active-energy-ray-curable hot-melt urethane resin composition of the present invention contains a hot-melt urethane (X) and an active energy ray polymerization initiator (Y), the hot-melt urethane (X) being obtained by converting more than 50% and 100% or less, preferably 60% to 100% of the total number of isocyanate groups in the urethane prepolymer (C) into terminal (meth)acryloyl groups by a reaction with hydroxyl groups in a reactive functional group-containing (meth)acrylic compound (D).

Examples of the reactive functional group-containing (meth)acrylic compound (D) include 2-hydroxyethyl (meth)acrylate (hereinafter, HEA), 2-hydroxypropyl (meth)acrylate, 3-hydroxypropyl (meth)acrylate, 4-hydroxybutyl (meth)acrylate, 2-hydroxy-3-phenoxypropyl (meth)acrylate, and pentaerythritol triacrylate. Among these compounds, 2-hydroxyethyl acrylate (HEA) is preferred from the standpoint of, for example, excellent rapid curability upon irradiation with active energy rays such as ultraviolet rays, electron beams, X-rays, infrared rays, or visible rays, and, in particular, an improvement in mechanical strength. These may be used alone or in combination of two or more compounds.

In the present invention, the hot-melt urethane (X) is obtained by converting more than 50% and 100% or less of the total number of isocyanate groups in the urethane prepolymer (C) into terminal (meth)acryloyl groups by a reaction with hydroxyl groups in the reactive functional group-containing (meth)acrylic compound (D). Consequently, a curing reaction by irradiation of active energy rays and a moisture (water) curing reaction by an NCO group can be utilized, and it is possible to exhibit excellent properties such as a shape-retaining property after being applied onto a base, flexibility, durability (in particular, hydrolysis resistance), a property of adhering to a base (in particular, a property of adhering to a metal), and rapid curability.

Specifically, preferably 5.0 to 20.0 parts by mass, more preferably 5.0 to 15.0 parts by mass of the reactive functional group-containing (meth)acrylic compound (D) is added to 100 parts by mass of the urethane prepolymer (C), thus obtaining the hot-melt urethane (X) in which more than 50% and 100% or less, preferably 80% to 100% of the total number of isocyanate groups in the urethane prepolymer (C) is converted into terminal (meth)acryloyl groups by a reaction with hydroxyl groups in the reactive functional group-containing (meth)acrylic compound (D). Next, a predetermined amount of active energy ray polymerization initiator (Y) is added to the hot-melt urethane (X). Thus, the active-energy-ray-curable hot-melt urethane resin composition of the present invention can be obtained.

By reacting isocyanate groups in the urethane prepolymer (C) with the reactive functional group-containing (meth) acrylic compound (D) in the above range, it is possible to obtain excellent properties such as rapid curability, a shape-retaining property after being applied onto a base, flexibility, durability (in particular, hydrolysis resistance), and a property of adhering to a base (in particular, a property of adhering to a metal).

In the reaction between the urethane prepolymer (C) and the reactive functional group-containing (meth)acrylic compound (D), a urethanization catalyst may be used as required. The urethanization catalyst may be optionally added at any stage of the urethanization reaction.

The urethanization catalyst is not particularly limited, and known urethanization catalyst may be used. Examples thereof include nitrogen-containing compounds such as triethylamine, triethylenediamine, and N-methylmorpholine; organometallic salts such as potassium acetate, zinc stearate, and stannous octoate; and organometallic compounds such as dibutyltin dilaurate.

The amount of urethanization catalyst used is not particularly limited as long as the urethanization catalyst does not adversely affect safety during reaction, stability and quality of an intermediate product or a product, etc.

The urethanization reaction is preferably conducted until the isocyanate group content (%) becomes substantially constant.

Next, the active energy ray polymerization initiator (Y) (hereinafter referred to as "polymerization initiator (Y)"), which is an essential component, will be described.

In the present invention, the amount of polymerization initiator (Y) added is preferably in the range of 0.5 to 5.0 parts by mass and more preferably in the range of 1.0 to 3.0 parts by mass relative to 100 parts by mass of the urethane prepolymer (C). By incorporating the polymerization initiator (Y) in the above range, curability can be adjusted in accordance with workability. As a result, an active-energy-ray-curable hot-melt urethane resin composition having an excellent shape-retaining property after being applied onto a base can be obtained.

Regarding the timing of the addition of the polymerization initiator (Y), the polymerization initiator (Y) is preferably added after the hot-melt urethane (X) is produced by converting more than 50% and 100% or less of the total number of terminal NCO groups in the urethane prepolymer (C) into terminal (meth)acryloyl groups by a reaction with hydroxyl groups in the reactive functional group-containing (meth) acrylic compound (D).

The reaction conditions (such as the temperature, the time, and the pressure) can be appropriately determined in consideration of conditions such as safety, the quality, and the cost, and are not particularly limited. For example, the reaction temperature is preferably in the range of 80° C. to 120° C., and the reaction time is preferably in the range of 0.5 to 4.0 hours. The reaction pressure may be set to any condition of normal pressure, a pressurized state, and a reduced pressure.

Examples of the polymerization initiator (Y) used in the present invention include, but are not particularly limited to, photopolymerization initiators and peroxides.

Examples of the photopolymerization initiators include, but are not particularly limited to, known photopolymerization initiators such as alkylphenone photopolymerization initiators, e.g., benzophenone, camphorquinone photopolymerization initiators, acylphosphine oxide photopolymerization initiators, and titanocene photopolymerization initiators. Examples of commercially available photopolymerization initiators include (hereinafter, trademarks) Quantacure (manufactured by International Biosynthetics Ltd.), Kayacure MBP (manufactured by Nippon Kayaku Co., Ltd.), Esacure BO (manufactured by Fratelli Lamberti), Trigonal 14 (manufactured by Akzo Nobel), Irgacure (manufactured by Ciba Geigy Ltd.), Darocure (manufactured by the same company), Speedcure (manufactured by the same company), and a mixture of Darocur 1173 and Fi-4 (manufactured by Eastman). These may be used alone or in combination of two or more initiators. Among these, Irgacure 651, which can provide excellent curability by irradiation of active energy rays such as ultraviolet rays, is preferred.

Examples of the peroxides include known peroxides such as ketone peroxides, peroxyketals, hydroperoxides, dialkyl peroxides, diacyl peroxides, peroxydicarbonates, and peroxyesters. These may be used alone or in combination of two or more peroxides. Among these, peroxyesters and peroxydicarbonates are preferred, and peroxydicarbonates are particularly preferred in curing under a temperature condition of 80° C. to 120° C. An example of the peroxydicarbonate is di(4-t-butylcyclohexyl)peroxydicarbonate. An example of a commercially available peroxydicarbonate is Peroyl TCP (manufactured by NOF Corporation).

The active-energy-ray-curable hot-melt urethane resin composition of the present invention may further contain porous silica (E).

The porous silica (E) is preferably silica having an average particle size in the range of 2.0 to 10.0 μm and an oil absorption of 150 to 300 mL per 100 g, and more preferably silica having an average particle size in the range of 2.0 to 10.0 μm and an oil absorption of 150 to 350 mL per 100 g. When the average particle size and the oil absorption of the porous silica (E) are in the above ranges, a melt viscosity excellent in terms of coating workability and a thixotropic property excellent in terms of shape-retaining property after being applied onto a base can be provided.

The term "oil absorption" in the present invention refers to a value measured in accordance with JIS K 5101.

The amount of porous silica (E) added is preferably in the range of 0.5 to 10 parts by mass, and more preferably in the range of 2.0 to 7.5 parts by mass relative to 100 parts by mass of the active-energy-ray-curable hot-melt urethane resin composition. The amount of porous silica (E) added is preferably in the above range because the melt viscosity is adjusted to be appropriate and excellent coating workability can be obtained, and excellent properties such as a shape-retaining property after being applied onto a base and a thixotropic property can be provided.

Examples of the commercially available porous silica (E) include Sylysia (hereinafter trademarks are described, manufactured by Fuji Silysia Chemical Ltd.), Fine Seal (manufactured by Tokuyama Corporation), Aerosil (manufactured by Nippon Aerosil Co., Ltd.), and ACEMATT (manufactured by Degussa). Among these, Sylysia 310P (manufactured by Fuji Silysia Chemical Ltd.), Sylysia 320 (manufactured by the same company), and Sylysia 350 (manufactured by the same company) are preferable because the viscosity of the resulting resin composition is easily adjusted. These may be used alone or in combination of two or more compounds.

The active-energy-ray-curable hot-melt urethane resin composition of the present invention may contain a phenoxy phosphazene compound (F) as a specific flame retardant.

Examples of the phenoxy phosphazene compound (F) include phosphorus-containing compounds represented by general formulae (3) to (5) below.

The compound represented by general formula (3) is the following cyclic phenoxy phosphazene compound:

[Chem. 3]

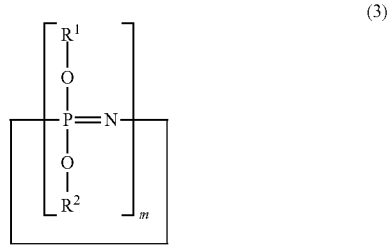

(3)

(In general formula (3), m represents an integer of 3 to 25, $R^1$ and $R^2$ each represent a phenyl group or a hydroxyphenyl group, and at least one hydroxyphenyl group is contained in one molecule.)

The compound represented by general formula (4) is the following linear phenoxy phosphazene compound:

[Chem. 4]

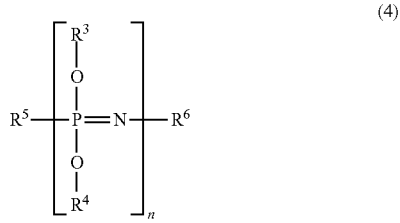

(4)

(In general formula (4), n represents an integer of 3 to 10,000, $R^3$ and $R^4$ each represent a phenyl group or a hydroxyphenyl group, at least one hydroxyphenyl group is contained in one molecule, $R^5$ represents —N=P(OC$_6$H$_5$)$_3$, —N=P (OC$_6$H$_5$)$_2$ (OC$_6$H$_4$OH), —N=P(OC$_6$H$_5$)(OC$_6$H$_4$OH)$_2$, —N=P(OC$_6$H$_4$OH)$_3$, —N=P(O)OC$_6$H$_5$, or —N=P(O) (OC$_6$H$_4$OH), and $R^6$ represents —P(OC$_6$H$_5$)$_4$, —P(OC$_6$H$_5$)$_3$ (OC$_6$H$_4$OH), —P(OC$_6$H$_5$)$_2$(OC$_6$H$_4$OH)$_2$, —P(OC$_6$H$_5$) (OC$_6$H$_4$OH)$_3$, —P(OC$_6$H$_4$OH)$_4$, —P(O)(OC$_6$H$_5$)$_2$, P(O) (OC$_6$H$_5$)(OC$_6$H$_4$OH), or —P(O) (OC$_6$H$_4$OH)$_2$.)

The compound represented by general formula (5) is a cross-linked phenoxy phosphazene compound obtained by cross-linking the above phenoxy phosphazene compound with a phenylene-based cross-linking group including at least one of bisphenylene groups represented by the following formula:

[Chem. 5]

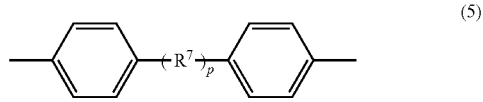

(5)

(In general formula (5), $R^7$ represents —C(CH$_3$)$_2$—, —SO$_2$—, —S—, or —O—, and p represents 0 or 1.)

The phenoxy phosphazene compounds (F) may be used alone or in combination of two or more compounds.

The amount of phenoxy phosphazene compound (F) used is preferably in the range of 15 to 40 parts by mass, and more preferably in the range of 20 to 30 parts by mass relative to 100 parts by mass of the urethane prepolymer (C). When the content of the phenoxy phosphazene compound (F) is in the above range, it is possible to exhibit excellent properties such as flame retardancy, adhesiveness (adhesive strength), bleeding resistance (durability), coating workability (viscosity suitability), and hydrolysis resistance.

The melting point of the phenoxy phosphazene compound (F) is preferably in the range of 80° C. to 130° C., and more preferably in the range of 90° C. to 120° C. A melting point of the compound (F) in the above range is preferable because the resulting active-energy-ray-curable hot-melt urethane resin composition has an appropriate melt viscosity and good coating workability (viscosity suitability), and excellent properties such as flame retardancy, heat-resistant adhesiveness (heat-resistant creep property), and adhesiveness (adhesive strength) can be obtained. A melting point of the compound (F) lower than 80° C. is not preferable because a problem such as bleeding may occur. A melting point of the compound (F) exceeding 130° C. is not preferable because the compound (F) must be mixed with the urethane prepolymer (C) under a high-temperature condition and thus coloring, degradation, thermal decomposition etc. of the resin tend to occur, and dispersibility of the compound (F) is poor and bleeding tends to occur.

From the standpoint that excellent flame retardancy can be provided, the phenoxy phosphazene compound (F) preferably has a content of phosphorus element of 10% by mass or more.

Among the phenoxy phosphazene compounds (F), the cyclic phenoxy phosphazene compound represented by general formula (3) is preferred. Examples of the commercially available products thereof include Rabitle FP-100 (trademark: manufactured by Fushimi Pharmaceutical Co., Ltd., melting point: 100° C. to 110° C.), Rabitle FP-110 (trademark: manufactured by the same company, melting point: 90° C. to 110° C.), and SPB-100 (trademark: manufactured by Otsuka Chemical Co., Ltd., melting point: 112° C.). Among these, Rabitle FP-110 is more preferred.

The timing of the blending of the phenoxy phosphazene compound (F) may be, for example, any of a step of charging raw materials, a reaction step, a taking-up step, a forming step, and the like. The form of the phenoxy phosphazene compound (F) is also not particularly limited.

In addition to the raw materials described above, various additives may be added to the active-energy-ray-curable hot-melt urethane resin composition of the present invention for any purpose in any step of the production process as long as the object of the present invention is not adversely affected.

Examples of the additives include a foam stabilizer, an antioxidant, a defoaming agent, an ultraviolet absorber, an abrasive grain, a filler, a pigment, a dye, a colorant, a thickener, a surfactant, a flame retardant, a plasticizer, a lubricant, an antistatic agent, a heat-resistant stabilizer, a tackifier, a curing catalyst, a stabilizer, a fluorescent brightening agent, a silane coupling agent, and a wax. If necessary, known thermoplastic resins, thermosetting resins, and the like may be appropriately selected and used as a blend resin as long as the object of the present invention is not impaired. Note that the above additives are merely examples, and the type and the amount of additive used are not particularly limited as long as the object of the present invention is not impaired.

Examples of the tackifier include rosin resins, rosin ester resins, hydrogenated rosin ester resins, terpene resins, terpene phenolic resins, hydrogenated terpene resins, and petroleum resins such as $C_5$ aliphatic resins, $C_9$ aromatic resins, and copolymer resins of a $C_5$ resin and a $C_9$ resin.

Examples of the plasticizer include dibutyl phthalate, dioctyl phthalate, dicyclohexyl phthalate, diisooctyl phthalate, diisodecyl phthalate, dibenzyl phthalate, butylbenzyl phthalate, trioctyl phosphate, epoxy-based plasticizer, toluene-sulfonamide, chloroparaffin, adipic acid esters, and castor oil. Examples of the plasticizer further include methyl acid phosphate (AP-1) and an acrylic surface adjusting agent (BYK-361N).

Examples of the stabilizer include hindered phenol compounds, benzotriazole compounds, and hindered amine compounds.

Examples of the filler include silicic acid derivatives, talc, metal powders, calcium carbonate, clay, and carbon black.

Examples of the ultraviolet absorber include benzotriazole compounds such as methyl hydroxyphenyl benzotriazole, butylmethyl hydroxyphenyl benzotriazole, and dibutyl hydroxyphenyl benzotriazole; and hindered amine compounds such as bis(tetramethyl piperidyl)sebacate and bis(pentamethyl piperidyl)sebacate.

The term "active energy rays" in the present invention refers to, for example, ultraviolet rays, electron beams, X-rays, infrared rays, and visible rays. From the standpoint of curability of the resin and prevention of degradation of the resin, ultraviolet rays, visible rays, and infrared rays are preferably used. Ultraviolet rays and visible rays are more preferred.

The wavelength of the active energy rays is not particularly limited. From the standpoint of the decomposition efficiency of the polymerization initiator, the wavelength of the active energy rays is preferably in the range of 200 to 750 nm, and more preferably in the range of 200 to 450 nm.

When the active-energy-ray-curable hot-melt urethane resin composition of the present invention is cured, various light sources such as mercury vapor lamps (low-pressure, high-pressure, and ultra-high-pressure), an incandescent lamp, a metal halide lamp, a tungsten lamp, a gallium lamp, an excimer, a hydrogen lamp, a deuterium lamp, a halogen lamp, a xenon lamp, a carbon arc lamp, a fluorescent lamp, and a He—Cd laser can be used for any purpose. Among these light sources, a high-pressure mercury vapor lamp is preferable.

The present invention is summarized as follows.

For a resin composition used in HDD packing or the like, properties as a function of packing, such as a shape-retaining property after being applied onto a base, flexibility, durability (in particular, hydrolysis resistance), a property of adhering to a base (in particular, a property of adhering to a metal), a low outgas property, and mechanical strength, are essentially required. However, no existing resin compositions satisfy all these required properties with a good balance.

In existing resin compositions, for example, in order to obtain flexibility and durability, polytetramethylene glycol (PTMG) is used as a polyol, which is a synthesis raw material of an isocyanate group-terminated urethane prepolymer. However, the use of only PTMG causes a problem in that the shape-retaining property after being applied onto a base is poor due to an insufficient initial cohesive force.

Therefore, various studies have been conducted in order to impart an initial cohesive force of a hot-melt urethane resin composition. As a result, according to the present invention, it was found that excellent properties such as a shape-retaining property after being applied onto a base, durability (in particular, hydrolysis resistance), flexibility, and mechanical strength can be obtained by an active-energy-ray-curable hot-melt urethane resin composition containing a hot-melt urethane (X) and an active energy ray polymerization initiator (Y), the hot-melt urethane (X) being produced by converting a specific amount of the total number of isocyanate groups in an isocyanate group-terminated urethane prepolymer (C) into terminal (meth)acryloyl groups by a reaction with hydroxyl groups in a reactive functional group-containing (meth) acrylic compound (D), the urethane prepolymer (C) being obtained by reacting a polyisocyanate component (B) with a polyol component (A) that contains an aromatic polyester polyol (a1) containing, as a glycol having a 2,2-dimethyl-1, 3-propylene structure in its molecule, neopentyl glycol in an amount of 90% by mole or more of a glycol component and a polyol (a2) (in particular, PTMG) other than the aromatic polyester polyol (a1).

As described above, the active-energy-ray-curable hot-melt urethane resin composition of the present invention has two properties, namely, a hot-melt property of solidification by cooling after application being fast and rapid curability upon irradiation with active energy rays (irradiation of, for example, ultraviolet rays, electron beams, X-rays, infrared rays, or visible rays), and is excellent in terms of properties such as a shape-retaining property after being applied onto a base, flexibility, durability (in particular, hydrolysis resistance), a property of adhering to a base (in particular, a property of adhering to a metal), a low outgas property, mechanical strength, and flame retardancy. Accordingly, the active-energy-ray-curable hot-melt urethane resin composition of the present invention is useful in a wide range of applications, for example, not only members for an electronic device, such as packing (various types of packing, e.g., packing for an electronic device, packing for an industrial member, packing for a hard disk drive, and packing for a housing case), cap sealing members, and fixing members (for example, a fixing member for a magnetic head and a fixing member between a substrate and a connector) but also sealing members, films, sheets, packing for industrial use, ribbons, adhesives (e.g., an adhesive for building materials and an adhesive for fibers), coating agents, and pressure-sensitive adhesives.

In particular, packing composed of the active-energy-ray-curable hot-melt urethane resin composition of the present invention has excellent properties such as a shape-retaining property after being applied onto a base, flexibility, durability (in particular, hydrolysis resistance), a property of adhering to a base (in particular, a property of adhering to a metal), a low outgas property, mechanical strength, and flame retardancy. Thus, the packing composed of the active-energy-ray-curable hot-melt urethane resin composition of the present invention is very useful as a member for an electronic device, in particular, as packing for a hard disk drive.

EXAMPLES

The present invention will be described more specifically by way of Examples. However, the scope of the present invention is not limited to the Examples.

In the present invention, the term "parts" represents "parts by mass", and the symbol "%" represents "% by mass" unless otherwise stated.

Measurement methods and evaluation methods used in the present invention are as follows.

[Method for Measuring Number-Average Molecular Weight (Mn) of Aromatic Polyester Polyol (a1)]

The Mn of aromatic polyester polyols (a1) prepared in each of Examples and Comparative Examples was determined by gel permeation chromatography (GPC) in terms of polystyrene under the conditions below.

Resin sample solution; 0.4% tetrahydrofuran (THF) solution

Model; HLC-8220GPC

Column; TSK gel (manufactured by TOSOH Corporation)

Eluate; THF

[Method for Measuring Melt Viscosity of Isocyanate Group-Terminated Urethane Prepolymer (C) (Hereinafter Referred to as "Urethane Prepolymer (C)" and Hot-Melt Urethane (X) Having Terminal (Meth)Acryloyl Groups (Hereinafter Referred to as "Hot-Melt Urethane (X)"]

A melt viscosity (mPa·s, measurement temperature: 100° C.) of each of urethane prepolymers (C) and hot-melt urethanes (X) obtained in Examples and Comparative Examples was measured with a cone-plate viscometer (manufactured by ICI).

[Method for Measuring Softening Temperature of Urethane Prepolymer (C)]

A softening temperature (dry-bulb softening point, ° C.) of each of urethane prepolymers (C) prepared in Examples and Comparative Examples was measured in accordance with JIS K 2207 at a temperature increasing rate of 5° C./min.

[Method for Evaluating Coating Workability]

Each of hot-melt urethanes (X) prepared in Examples and Comparative Examples was melted by heating at 100° C., and a syringe having an inner diameter of 600 μm was then filled with the hot-melt urethane (X). The hot-melt urethane (X) was applied onto an aluminum plate with the syringe at a pressure of 0.30 MPa, at a processing speed of 100 mm/sec, and an application time of 10 seconds. The amount of discharge (g) in this test was evaluated in accordance with the criteria below.

Evaluation Criteria of Coating Workability

A: More than 0.25 g and 0.50 g or less.

B: More than 0.10 g and 0.25 g or less.

C: 0.10 g or less.

[Method for Evaluating Shape-Retaining Property after being Applied onto Base]

Each of hot-melt urethanes (X) prepared in Examples and Comparative Examples was melted by heating at 100° C., and discharged under the application conditions described above (with a syringe having an inner diameter of 600 μm) to apply the hot-melt urethane onto a base (type of base: aluminum plate A1050P).

Next, 30 seconds later, ultraviolet irradiation was conducted [irradiation conditions: with a conveyor-type ultraviolet irradiation device "CSOT-40" (manufactured by GS Yuasa Corporation, with a high-pressure mercury vapor lamp, intensity: 120 W/cm, conveyor speed: 10 m/min, passage: once) which was set so that the base was irradiated with 145 mJ/cm$^2$ of ultraviolet rays each time the base passed in the device once]. A height (μm) of a formed part after curing was measured with a scanning electron microscope (SEM), and evaluation was conducted in accordance with the criteria below.

Evaluation Criteria of Shape-Retaining Property after being Applied onto Base

A: More than 580 μm and 600 μm.

B: More than 540 μm and 580 μm or less.

C: 540 μm or less.

[Method for Evaluating Flexibility of Film after Curing by Ultraviolet Irradiation]

Each of active-energy-ray-curable hot-melt urethane resin compositions prepared in Examples and Comparative Examples was melted by heating at 100° C., and was applied onto release paper so as to have a thickness of 200 μm with a knife coater heated at 100° C.

Next, the coated surface was irradiated with ultraviolet rays by allowing the resulting sample to pass once in a conveyor-type ultraviolet irradiation device CSOT-40 (manufactured by GS Yuasa Corporation, with a high-pressure mercury vapor lamp, intensity: 120 W/cm, conveyor speed: 5 m/min), which was set so that the sample was irradiated with 145 mJ/cm$^2$ of ultraviolet rays each time the sample passed in the device. Next, the sample was left to stand in a constant-temperature, constant-humidity chamber at a temperature of 23° C. and a relative humidity of 65% for three days to conduct a moisture curing reaction. The film formed after standing was separated from the release paper. Thus, a cured film was obtained.

The amount of ultraviolet irradiation was measured in a wavelength range of 300 to 390 nm using a UV checker UVR-N1 (manufactured by GS Yuasa Corporation).

The cured film was cut to a size of 5 mm in width×70 mm in length×200 μm in thickness to prepare a test specimen. Tensile properties of the test specimen were evaluated in accordance with JIS K-7311 using a Tensilon [manufactured by Shimadzu Corporation, head speed: 300 mm/min]. Regarding flexibility of the cured film, the value of 100% modulus (MPa) among the tensile properties was evaluated in accordance with the criteria below.

Evaluation Criteria of Flexibility of Film after Curing

A: 4.0 MPa or less.

B: More than 4.0 MPa and 8.0 MPa or less.

C: More than 8.0 MPa.

[Method for Evaluating Durability (Hydrolysis Resistance) of Cured Film]

The cured film prepared above was left to stand in a constant-temperature, constant-humidity chamber set at a temperature of 70° C. and a relative humidity of 95% for five weeks, and the tensile strength of the cured film was then measured. Specifically, the cured film was cut to a size of 5 mm in width×70 mm in length×200 μm in thickness to prepare a test specimen. Tensile properties of the test specimen were evaluated in accordance with JIS K-7311 using a Tensilon [manufactured by Shimadzu Corporation, head speed=300 mm/min].

Regarding durability of the cured film, the value of retention ratio (%) of a tensile strength among the tensile properties after the test was evaluated in accordance with the criteria below.

Evaluation Criteria of Durability (Hydrolysis Resistance) of Cured Film

A: 90% or more.

B: 60% or more and less than 90%.

C: Less than 60%.

[Method for Evaluating Outgas Property]

The formed part used in the evaluation of the shape-retaining property after being applied onto the base was subjected to heat treatment in a dryer set at a temperature of 120° C. for 5 minutes. Quantitative analysis of outgas components was conducted with a gas chromatograph-mass spectrometer (GC-MASS) in accordance with VDA 278 (volatile organic compounds (VOC)) with a sample weight of 30 mg and under the thermal desorption condition of 90° C. for 30 minutes.

The value of the total area of components detected at retention times up to eicosane having 20 carbon atoms was represented in terms of toluene and defined as a VOC value, that is, the amount of outgas (ppm).

An outgas property of the formed part was evaluated on the basis of the VOC value.

Evaluation Criteria of Outgas Property

A: 10 ppm or less.

B: More than 10 ppm and 40 ppm or less.

C: More than 40 ppm.

[Method for Evaluating Property of Adhering to Base]

A peel strength of the formed part applied onto an aluminum plate A5052, the formed part being prepared in the method for evaluating the shape-retaining property after being applied onto a base, was evaluated in accordance with JIS K-7311 using a Tensilon [manufactured by Shimadzu Corporation, head speed=200 mm/min]. Regarding the property of adhering to a base, the value of the peel strength (N) was evaluated in accordance with the criteria below.

Evaluation Criteria of Property of Adhering to Base
A: 2.0 N or more.
B: 0.5 N or more and less than 2.0 N.
C: Less than 0.5 N.

[Method for Evaluating Rapid Curability]

The presence or absence of a residue on the aluminum plate after peeling, the aluminum plate being used in the above evaluation of the property of adhering to a base, was visually observed to evaluate rapid curability in accordance with the criteria below.

Evaluation Criteria of Rapid Curability
A: No residue was left.
B: A slight amount of residue was left on the surface.
C: A residue was apparently left on the surface.

[Method for Determining Flammability (Flame Retardancy)]
(1) Measurement Sample

Five test specimens (125 mm in length×13 mm in width× 0.8 mm or 1.0 mm in thickness) were prepared. Flammability of the test specimens was determined in accordance with the test for flammability of plastic materials "UL94".

(2) Test Method

The test is common in three types of flammability (V-2, V-1, and V-0). A test specimen is supported in a vertical position and a flame of a gas burner is applied to the lower end of the test specimen for 10 seconds.

If burning ceases within 30 seconds, the flame is reapplied for 10 seconds.

(3) Criteria

V-0 is the best in terms of flame retardancy. V-1 is the second best in terms of flame retardancy, and V-2 is the third in terms of flame retardancy.

V-2:

The specimens do not burn with flaming combustion for 30 seconds or more after either application of the test flame.

The total flaming combustion time does not exceed 250 seconds for the 10 flame applications for each set of five specimens.

The specimens do not burn up to the position of a holding clamp.

The specimens can drip flaming particles that ignite absorbent cotton located below the specimen.

The specimens do not have glowing combustion that persists for 60 seconds or more after the second removal of the test flame.

V-1:

The specimens do not burn with flaming combustion for 30 seconds or more after either application of the test flame.

The total flame combustion time does not exceed 250 seconds for the 10 flame applications for each set of five specimens.

The specimens do not burn up to the position of a holing clamp.

The specimens do not drip flaming particles that ignite absorbent cotton located below the specimen.

The specimens do not have glowing combustion that persists for 60 seconds or more after the second removal of the test flame.

V-0:

The specimens do not burn with flaming combustion for 10 seconds or more after either application of the test flame.

The total flaming combustion time does not exceed 50 seconds for the 10 flame applications for each set of five specimens.

The specimens do not burn up to the position of a holding clamp.

The specimens do not drip flaming particles that ignite absorbent cotton located below the specimen.

The specimens do not have glowing combustion that persists for 30 seconds or more after the second removal of the test flame.

Synthesis Example 1

Synthesis of Isocyanate Group-Containing Urethane Prepolymer (C-1)

An aromatic polyester polyol (a1-1) having a number-average molecular weight (Mn) of 1,000 was prepared by reacting 55 parts by mass of neopentyl glycol (NPG) and 2.0 parts by mass of diethylene glycol (DEG) with 43 parts by mass of phthalic anhydride (OPA). In a reaction container, 20 parts by mass of the aromatic polyester polyol (a1-1) and 80 parts by mass of polytetramethylene glycol (PTMG) (a2-1) were charged and heated to 100° C. under a reduced pressure condition, and dehydration was conducted until the moisture percentage became 0.05% by mass. Thus, a polyol (A), which is a mixture, was prepared.

Subsequently, 22 parts by mass of m-xylene diisocyanate serving as a polyisocyanate (B) was added to the polyol (A) that had been cooled to 70° C. The mixture was heated to 100° C. and allowed to react for three hours until the isocyanate group content became constant. Thus, an isocyanate group-terminated urethane prepolymer (C-1) was prepared. The urethane prepolymer (C-1) had a melt viscosity of 1,890 mPa·s at 100° C. and an isocyanate group content (NCO %) of 3.90% by mass. Properties of the urethane prepolymer (C-1) prepared in Synthesis Example 1 are summarized in Table 1.

Synthesis Examples 2 to 14

Urethane prepolymers (C-2) to (C-14) were synthesized by the same procedure in accordance with the compositions shown in Table 1.

Properties of the urethane prepolymers (C-2) to (C-14) prepared in Synthesis Examples 2 to 14 are summarized in Tables 1 and 2.

Regarding the aromatic polyester polyol (a1) prepared in Synthesis Examples 1 to 14, the types and compositions of glycols and an aromatic carboxylic acid, which are raw materials of the aromatic polyester polyol containing a 2,2-dimethyl-1,3-propylene structure in its molecule in an amount of 90% by mole or more of a glycol component, are as follows:

(a1-1) Aromatic Polyester Polyol
  Composition: NPG/DEG/OPA
  Mn: 1,000
  Glycol: NPG/DEG=96.6/3.4% by mole
  Aromatic carboxylic acid: OPA=100% by mole (a1-2) Aromatic Polyester Polyol
  Composition: NPG/TPA
  Mn: 1,000
  Glycol: NPG=100% by mole
  Aromatic carboxylic acid: TPA=100% by mole

Example 1

Synthesis of Active-Energy-Ray-Curable Hot-Melt Urethane Resin Composition (UVHM1)

First, 100 parts by mass of the isocyanate group-containing urethane prepolymer (C-1) prepared in Synthesis Example 1 was melted by heating at 100° C. Subsequently, 6.6 parts by mass of 2-hydroxyethyl acrylate (HEA) serving as a reactive functional group-containing (meth)acrylic compound (D) and 0.01 parts by mass of stannous octoate were added thereto. The resulting mixture was allowed to react at an inner temperature of 80° C. until the NCO % becomes constant. Thus, a hot-melt urethane (X-1) having terminal (meth)acryloyl groups was prepared.

Regarding the ratio of the number of NCO groups that reacted with HEA serving as the reactive functional group-containing (meth)acrylic compound (D) to the total number of isocyanate groups in the urethane prepolymer (C-1), i.e., [[OH/NCO]×100(%)], the compounds were charged such that the theoretical value of the total number of NCO groups became 55%.

The composition and properties of the hot-melt urethane (X-1) are summarized in Table 1. The hot-melt urethane (X-1) had a melt viscosity of 1,900 mPa·s at 100° C. and an isocyanate group content (NCO %) of 1.93% by mass.

Next, the hot-melt urethane (X-1) having terminal (meth)acryloyl groups and 2.0 parts of Irgacure 651 (manufactured by Ciba Specialty Chemicals Inc.), which is an ultraviolet curing agent serving as the active energy ray polymerization initiator (Y-1), were mixed while stirring. Thus, an active-energy-ray-curable hot-melt urethane resin composition (UVHM1) of the present invention was prepared.

The ratio of the number of NCO groups that reacted with the reactive functional group-containing (meth)acrylic compound (D) to the total number of isocyanate groups in the urethane prepolymer (C-1), i.e., [[OH/NCO]×100(%)] can be determined as follows by a common method. An excess amount of dibutylamine is added so that remaining isocyanate groups are reacted with dibutylamine. Next, the amount of remaining dibutylamine is determined by a back titration method using hydrochloric acid. Thus, the amount of isocyanate groups is calculated to determine the ratio.

For each of the urethane prepolymers (C-2) to (C-14) shown in Tables 1 and 2, the ratio of the number of NCO groups that reacted with the reactive functional group-containing (meth)acrylic compound (D), i.e., [[OH/NCO]×100 (%)] was determined by the same method used in the urethane prepolymer (C-1).

[Preparation of Formed Part Using Active-Energy-Ray-Curable Hot-Melt Urethane Resin Composition]

The active-energy-ray-curable hot-melt urethane resin composition (UVHM1) was melted by heating at 100° C., and was applied onto an aluminum plate in the form of a bead using a dispenser head having an inner diameter of 0.6 mm and heated at 100° C. at a discharge pressure of 0.30 MPa, a process speed of 100 mm/sec, and an application time of 10 seconds. Subsequently, ultraviolet irradiation was conducted by allowing the aluminum plate to once pass in a conveyor-type ultraviolet irradiation device "CSOT-40" (manufactured by GS Yuasa Corporation, with a high-pressure mercury vapor lamp, intensity: 120 W/cm, conveyor speed: 30 m/min) which was set so that the aluminum plate was irradiated with 145 mJ/cm$^2$ of ultraviolet rays (UV) each time the plate passed in the device. Next, the aluminum plate was left to stand in a constant-temperature, constant-humidity chamber at a temperature of 23° C. and at a relative humidity of 65% for three days. Thus, a formed part 1 after moisture curing was prepared. The evaluation results of the characteristics of the formed part 1 using the active-energy-ray-curable hot-melt urethane resin composition of the present invention are shown in Table 2. The surface tack of the formed part 1 was eliminated after UV irradiation, and the formed part 1 had appropriate flexibility and mechanical strength, and had excellent properties such as a shape-retaining property after being applied onto a base, durability (hydrolysis resistance), and a low outgas property.

Example 2 and Example 3

In Example 2 and Example 3, active-energy-ray-curable hot-melt urethane resin compositions (UVHM2) and (UVHM3) of the present invention were prepared as in Example 1 except that the amount of HEA serving as the reactive functional group-containing (meth)acrylic compound (D) was changed to 9.9 parts by mass and 13.2 parts by mass, respectively.

Regarding the ratio of the number of NCO groups that reacted with HEA serving as the reactive functional group-containing (meth)acrylic compound (D) to the total number of isocyanate groups in the urethane prepolymer (C-1), i.e., [[OH/NCO]×100(%)], the compounds were charged such that the theoretical value of the total number of NCO groups became 75% (Example 2) and 100% (Example 3).

Next, a formed part 2 and a formed part 3 after moisture curing were prepared as in Example 1 using the active-energy-ray-curable hot-melt urethane resin compositions (UVHM2) and (UVHM3) of the present invention, respectively.

The evaluation results of the formed parts 2 and 3 are shown in Table 2. The surface tack of the formed parts 2 and 3 was eliminated after UV irradiation, and the formed parts 2 and 3 had appropriate flexibility and mechanical strength, and had excellent properties such as a shape-retaining property after being applied onto a base, durability (hydrolysis resistance), and a low outgas property.

Example 4 to Example 16 and Comparative Example 1 to Comparative Example 7

[Example 4] to [Example 16] and [Comparative Example 1] to [Comparative Example 7] were conducted by the same procedure in accordance with the compositions shown in Tables 1 and 2. Evaluation results of urethane prepolymers (C-2) to (C-13), hot-melt urethanes (X-4) to (X-20), active-energy-ray-curable hot-melt urethane resin compositions (UVHM4) to (UVHM23), and formed parts 4 to 23 prepared therein are shown in Tables 1 and 2.

Comparative Example 8

A compound containing 5 parts of 2-ethyl-2-butylpropanediol diacrylate and 95 parts of isononyl acrylate, which serve as acrylate components, 35 parts of SIBSTAR 072T (trade name, manufactured by Kaneka Corporation, styrene-isobutylene-styrene copolymer having a triblock structure, styrene content: 23% by mass), 2 parts of Irgacure 651 (manufactured by Ciba Specialty Chemicals Inc.) serving as a photopolymerization initiator, and 6 parts by mass of Aerosil 200 (trade name, manufactured by Nippon Aerosil Co., Ltd., non-surface-treated fumed silica) was mixed while stirring in a planetary mixer heated at 60° C. Thus, an ultraviolet-curable resin composition (X-21) was prepared.

The ultraviolet-curable resin composition (X-21) was irradiated with ultraviolet rays as in Examples and Comparative Examples described above. Measurements of flexibility, durability, coating workability, the shape-retaining property, and outgas, and evaluations of the property of adhering to a base and rapid curability were conducted. The formed part 24 had flexibility. However, a large amount of outgas was generated from the formed part 24, and the formed part 24 was poor in terms of property of adhering to a base after UV curing and rapid curability.

TABLE 1

|  | Example 1 | Example 2 | Example 3 | Example 4 | Example 5 | Example 6 | Example 7 | Example 8 |
|---|---|---|---|---|---|---|---|---|
| Abbreviation of NCO group-terminated urethane prepolymer (C) | (C-1) | (C-1) | (C-1) | (C-2) | (C-3) | (C-4) | (C-5) | (C-6) |
| Polyol component (A) |  |  |  |  |  |  |  |  |
| Aromatic polyester polyol (a1) containing 2,2-dimethyl-1,3-propylene structure in glycol component (part) |  |  |  |  |  |  |  |  |
| NPG/DEG/OPA [Mn = 1000] (a1-1) | 20 | 20 | 20 | 40 | 70 | 40 | 40 | 20 |
| Polyol (a2) other than polyol (a1) (part) |  |  |  |  |  |  |  |  |
| PTMG [Mn = 2000] (a2-1) | 80 | 80 | 80 | 60 | 30 | 60 | 60 | 80 |
| MN 700 (a2-2) |  |  |  |  |  |  |  | 2 |
| Polyisocyanate component (B) |  |  |  |  |  |  |  |  |
| XDI (B-1) | 22.0 | 22.0 | 22.0 | 24.1 | 27.1 |  | 24.1 | 23.0 |
| MDI (B-2) |  |  |  |  |  | 24.0 |  |  |
| Total | 122 | 122 | 122 | 124 | 127 | 124 | 124 | 125 |
| Properties of urethane prepolymer (C) |  |  |  |  |  |  |  |  |
| NCO % | 3.90 | 3.90 | 3.90 | 3.91 | 3.89 | 3.91 | 3.90 | 3.88 |
| Melt viscosity (mPa · s/100° C.) | 1890 | 1890 | 1890 | 1740 | 1740 | 2100 | 1740 | 1890 |
| Softening temperature (° C.) | 35 | 35 | 35 | 45 | 60 | 55 | 45 | 35 |
| Hot-melt urethane (X) having terminal (meth)acryloyl group | (X-1) | (X-2) | (X-3) | (X-4) | (X-5) | (X-6) | (X-7) | (X-8) |
| Reactive functional group-containing (meth)acrylic compound (D) |  |  |  |  |  |  |  |  |
| HEA (D-1) | HEA | HEA | HEA | HEA | HEA | HEA | HEA | HEA |
| Ratio of the number of NCO groups reacted with OH groups in (D) [OH in (D)/NCO] × 100 (%) | 55 | 75 | 100 | 75 | 75 | 75 | 75 | 75 |
| Properties of reactive functional group-containing (meth)acrylic compound (D) |  |  |  |  |  |  |  |  |
| Melt viscosity (mPa · s/100° C.) | 1900 | 1960 | 2010 | 1860 | 3670 | 2500 | 2250 | 2100 |
| NCO % | 1.93 | 0.98 | 0.00 | 0.98 | 0.98 | 0.97 | 0.98 | 0.98 |
| Active-energy-ray-curable hot-melt urethane resin composition (UVHM) | 1 | 2 | 3 | 4 | 5 | 6 | 7 | 8 |
| Abbreviation of NCO-terminated urethane prepolymer (C) | (C-1) | (C-1) | (C-1) | (C-2) | (C-3) | (C-4) | (C-5) | (C-6) |
| Ratio of the number of NCO groups reacted with OH groups in reactive functional group-containing (meth)acrylic compound (D) to the total number of NCO groups in prepolymer (C) [OH in (D)/NCO] × 100 (%) | 55 | 75 | 100 | 75 | 75 | 75 | 75 | 75 |
| Amount of urethane prepolymer (C) used (part) | 100 | 100 | 100 | 100 | 100 | 100 | 100 | 100 |
| Terminal acryloyl group-containing curable hot-melt urethane (X) | (X-1) | (X-2) | (X-3) | (X-4) | (X-5) | (X-6) | (X-7) | (X-8) |
| Active energy ray polymerization initiator (Y) (part) |  |  |  |  |  |  |  |  |
| Irgacure 651 (Y-1) | 2 | 2 | 2 | 2 | 2 | 2 | 2 | 2 |
| Peroyl TCP (Y-2) |  |  |  |  |  |  |  |  |
| Porous silica (E) (part) |  |  |  |  |  |  |  |  |
| Sylysia 350 (E-1) |  |  |  |  |  |  | 5 |  |
| Evaluation results |  |  |  |  |  |  |  |  |
| Formed part No. | 1 | 2 | 3 | 4 | 5 | 6 | 7 | 8 |
| Coating workability at 100° C.: | A | A | A | A | A | A | A | A |
| Shape-retaining property after being applied: | A | A | A | A | A | A | A | A |
| Flexibility: | A | A | B | B | B | A | B | A |

TABLE 1-continued

| Mechanical property in ordinary state | | | | | | | | |
|---|---|---|---|---|---|---|---|---|
| 100% modulus (MPa) | 2.0 | 3.5 | 5.0 | 4.5 | 6.5 | 2.6 | 5.7 | 2.5 |
| Stress at breaking point (MPa) | 10.5 | 11.0 | 12.5 | 12.5 | 13.0 | 10.0 | 12.0 | 14.0 |
| Elongation at breaking point (%) | 240 | 210 | 180 | 200 | 80 | 280 | 140 | 240 |
| Durability: Mechanical property after hydrolysis resistance test (70° C., 95% RH, 5 weeks) | | | | | | | | |
| Evaluation of durability: Mechanical property after hydrolysis resistance test | A | A | A | A | A | A | A | A |
| 100% modulus (MPa) | 2.0 | 3.5 | 4.8 | 4.5 | 6.5 | 3.0 | 5.5 | 2.5 |
| Stress at breaking point (MPa) | 10.0 | 11.0 | 12.0 | 12.0 | 12.5 | 8.0 | 12.0 | 14.0 |
| Elongation at breaking point (%) | 230 | 200 | 170 | 200 | 70 | 285 | 135 | 240 |
| Outgas (total VOC): | A | A | A | A | A | A | A | A |
| Property of adhering to base | A | A | A | A | A | A | A | A |
| Rapid curability | A | A | A | A | A | A | A | A |

| | Example 9 | Example 10 | Example 11 | Example 12 | Example 13 | Example 14 | Example 15 | Example 16 |
|---|---|---|---|---|---|---|---|---|
| Abbreviation of NCO group-terminated urethane prepolymer (C) | (C-1) | (C-1) | (C-1) | (C-1) | (C-1) | (C-1) | (C-7) | (C-8) |
| Polyol component (A) | | | | | | | | |
| Aromatic polyester polyol (a1) containing 2,2-dimethyl-1,3-propylene structure in glycol component (part) | | | | | | | | |
| NPG/DEG/OPA [Mn = 1000] (a1-1) | 20 | 20 | 20 | 20 | 20 | 20 | 10 | |
| NPG/TPA [Mn = 1000] (a1-2) | | | | | | | | 70 |
| Polyol (a2) other than polyol (a1) (part) | | | | | | | | |
| PTMG [Mn = 2000] (a2-1) | 80 | 80 | 80 | 80 | 80 | 80 | 90 | 30 |
| MN 700 (a2-2) | | | | | | | | |
| Polyisocyanate component (B) | | | | | | | | |
| XDI (B-1) | 22.0 | 22.0 | 22.0 | 22.0 | 22.0 | 22.0 | 21.0 | 27.1 |
| MDI (B-2) | | | | | | | | |
| Total | 122 | 122 | 122 | 122 | 122 | 122 | 121 | 127.1 |
| Properties of urethane prepolymer (C) | | | | | | | | |
| NCO % | 3.90 | 3.90 | 3.91 | 3.90 | 3.91 | 3.91 | 3.91 | 3.88 |
| Melt viscosity (mPa · s/100° C.) | 1890 | 1890 | 1890 | 1890 | 1890 | 1890 | 1790 | 3250 |
| Softening temperature (° C.) | 35 | 35 | 35 | 35 | 35 | 35 | 28 | 65 |
| Hot-melt urethane (X) having terminal (meth)acryloyl group | (X-1) | (X-2) | (X-3) | (X-9) | (X-10) | (X-11) | (X-12) | (X-13) |
| Reactive functional group-containing (meth)acrylic compound (D) | | | | | | | | |
| HEA (D-1) | HEA | HEA | HEA | 4HBA | HEMA | HEA | HEA | HEA |
| Ratio of the number of NCO groups reacted with OH groups in (D) | 55 | 75 | 100 | 75 | 75 | 75 | 75 | 75 |
| [OH in (D)/NCO] × 100 (%) | | | | | | | | |
| Properties of reactive functional group-containing (meth)acrylic compound (D) | | | | | | | | |
| Melt viscosity (mPa · s/100° C.) | 1900 | 1960 | 2010 | 1920 | 1910 | 1960 | 1720 | 3300 |
| NCO % | 1.93 | 0.98 | 0.00 | 0.97 | 0.98 | 0.98 | 0.97 | 0.97 |
| Active-energy-ray-curable hot-melt urethane resin composition (UVHM) | 9 | 10 | 11 | 12 | 13 | 14 | 15 | 16 |
| Abbreviation of NCO-terminated urethane prepolymer (C) | (C-1) | (C-1) | (C-1) | (C-1) | (C-1) | (C-1) | (C-7) | (C-8) |
| Ratio of the number of NCO groups reacted with OH groups in reactive functional group-containing (meth)acrylic compound (D) to the total number of NCO groups in prepolymer (C) | 55 | 75 | 100 | 75 | 75 | 75 | 75 | 75 |
| [OH in (D)/NCO] × 100 (%) | | | | | | | | |
| Amount of urethane prepolymer (C) used (part) | 100 | 100 | 100 | 100 | 100 | 100 | 100 | 141 |
| Terminal acryloyl group-containing curable hot-melt urethane (X) | (X-1) | (X-2) | (X-3) | (X-9) | (X-10) | (X-11) | (X-12) | (X-13) |

TABLE 1-continued

| | | | | | | | | |
|---|---|---|---|---|---|---|---|---|
| Active energy ray polymerization initiator (Y) (part) | | | | | | | | |
| Irgacure 651 (Y-1) | | | | 2 | 2 | 2 | 2 | 2 |
| Peroyl TCP (Y-2) | 2 | 2 | 2 | | | | | |
| Porous silica (E) (part) | | | | | | | | |
| Sylysia 350 (E-1) | | | | | | | 5 | |
| Evaluation results | | | | | | | | |
| Formed part No. | 9 | 10 | 11 | 12 | 13 | 14 | 15 | 16 |
| Coating workability at 100° C.: | A | A | A | A | A | A | A | A |
| Shape-retaining property after being applied: | A | A | A | A | A | A | B | A |
| Flexibility: | A | A | B | A | A | B | A | B |
| Mechanical property in ordinary state | | | | | | | | |
| 100% modulus (MPa) | 2.2 | 3.7 | 5.2 | 3.0 | 2.8 | 4.5 | 2.5 | 9.8 |
| Stress at breaking point (MPa) | 12.0 | 13.0 | 13.0 | 10.5 | 13.0 | 13.0 | 9.5 | 6.5 |
| Elongation at breaking point (%) | 250 | 220 | 190 | 240 | 220 | 195 | 200 | 130 |
| Durability: Mechanical property after hydrolysis resistance test (70° C., 95% RH, 5 weeks) | | | | | | | | |
| Evaluation of durability: Mechanical property after hydrolysis resistance test | A | A | A | A | A | A | A | A |
| 100% modulus (MPa) | 2.2 | 3.6 | 5.1 | 2.8 | 2.7 | 4.6 | 2.5 | 9.6 |
| Stress at breaking point (MPa) | 12.0 | 13.0 | 13.0 | 10.0 | 12.0 | 12.5 | 9.0 | 6.4 |
| Elongation at breaking point (%) | 250 | 210 | 190 | 220 | 210 | 190 | 200 | 120 |
| Outgas (total VOC): | A | A | A | B | B | A | A | A |
| Property of adhering to base | A | A | A | A | A | A | A | B |
| Rapid curability | A | A | A | B | B | A | A | A |

TABLE 2

| | C. Ex. 1 | C. Ex. 2 | C. Ex. 3 | C. Ex. 4 | C. Ex. 5 | C. Ex. 6 | C. Ex. 7 | C. Ex. 8 |
|---|---|---|---|---|---|---|---|---|
| Abbreviation of NCO-terminated urethane prepolymer (C) | (C-9) | (C-9) | (C-10) | (C-10) | (C-11) | (C-12) | (C-13) | (C-14) |
| Polyol component (A) | | | | | | | | |
| Aromatic polyester polyol (a1) containing 2,2-dimethyl-1,3-propylene structure in glycol component | | | | | | | | |
| NPG/DEG/OPA [Mn = 1000] (a1-1) | 20 | 20 | 70 | 70 | | | 40 | |
| NPG/TPA [Mn = 1000] (a1-2) | | | | | | | | |
| Polyol (a2) other than polyol (a1) (part) | | | | | | | | |
| PTMG [Mn = 2000] (a2-1) | 80 | 80 | 30 | 30 | 80 | 20 | 60 | |
| DEG/OPA [Mn = 1000] (a2-3) | | | | | | 20 | | |
| PPG [Mn = 2000] (a2-4) | | | | | | 80 | | |
| Polyisocyanate component (B) | | | | | | | | |
| XDI (B-1) | 22.0 | 22.0 | 27.1 | 27.1 | 22.0 | 20.0 | 24.1 | |
| MDI (B-2) | | | | | | | | |
| 2-Ethyl-2-butylpropanediol diacrylate | | | | | | | | 5.0 |
| Isononyl acrylate | | | | | | | | 95.0 |
| SIBSAR 072T | | | | | | | | 35.0 |
| Aerosil 200 | | | | | | | | 6.0 |
| Total | 122 | 122 | 127 | 127 | 122 | 120 | 124 | 141 |
| Properties of urethane prepolymer (C) | | | | | | | | |
| NCO % | 3.91 | 3.91 | 3.89 | 3.80 | 3.91 | 3.92 | 3.91 | 0.00 |
| Melt viscosity (mPa · s/100° C.) | 1890 | 1890 | 3540 | 3540 | 1650 | 1320 | 1740 | 200/60° C. |
| Softening temperature (° C.) | 35 | 35 | 60 | 60 | 38 | 20 or lower (Liquid) | 45 | 20 or lower (Liquid) |
| Hot-melt urethane (X) having terminal (meth)acryloyl group | (X-14) | (X-15) | (X-16) | (X-17) | (X-18) | (X-19) | (X-20) | (X-21) |

TABLE 2-continued

|  | C. Ex. 1 | C. Ex. 2 | C. Ex. 3 | C. Ex. 4 | C. Ex. 5 | C. Ex. 6 | C. Ex. 7 | C. Ex. 8 |
|---|---|---|---|---|---|---|---|---|
| Reactive functional group-containing (meth)acrylic compound (D) | | | | | | | | |
| HEA(D-1) | HEA | HEA | HEA | HEA | HEA | HEA | HEA | |
| Ratio of the number of NCO groups reacted with OH groups in (D) [OH in (D)/NCO] × 100 (%) | 0 | 40 | 0 | 40 | 75 | 75 | 75 | |
| Properties of reactive functional group-containing (meth)acrylic compound (D) | | | | | | | | |
| Melt viscosity (mPa · s/100° C.) | 1890 | 2100 | 1740 | 3680 | 1660 | 1690 | 1860 | 200/60° C. |
| NCO % | 3.89 | 2.30 | 3.89 | 2.31 | 1.95 | 0.98 | 0.98 | 0.00 |
| Active-energy-ray-curable hot-melt urethane resin composition (UVHM) | 17 | 18 | 19 | 20 | 21 | 22 | 23 | 24 |
| Abbreviation of NCO-terminated urethane prepolymer (C) | (C-9) | (C-9) | (C-10) | (C-10) | (C-11) | (C-12) | (C-13) | (C-14) |
| Ratio of the number of NCO groups reacted with OH groups in reactive functional group-containing (meth)acrylic compound (D) to the total number of NCO groups in prepolymer (C) [OH in (D)/NCO] × 100 (%) | 0 | 40 | 0 | 40 | 75 | 75 | 75 | 0 |
| Amount of urethane prepolymer (C) used (part) | 100 | 100 | 100 | 100 | 100 | 100 | 100 | 141 |
| Terminal acryloyl group-containing curable hot-melt urethane (X) | (X-14) | (X-15) | (X-16) | (X-17) | (X-18) | (X-19) | (X-20) | (X-21) |
| Active energy ray polymerization initiator (Y) (part) | | | | | | | | |
| Irgacure 651 (Y-1) | 2 | 2 | 2 | 2 | 2 | 2 | 0 | 2 |
| Peroyl TCP (Y-2) | | | | | | | | |
| Evaluation results | | | | | | | | |
| Formed part No. | 17 | 18 | 19 | 20 | 21 | 22 | 23 | 24 |
| Coating workability at 100° C.: | A | A | A | A | A | A | A | A |
| Shape-retaining property after being applied: | C | C | C | C | C | C | C | A |
| Flexibility: | A | A | A | A | C | A | C | A |
| Mechanical property in ordinary state | | | | | | | | |
| 100% modulus (MPa) | 1.0 | 2.0 | 1.5 | 3.0 | 12.0 | 1.0 | Could not be measured. (Tack was observed.) | 2.2 |
| Stress at breaking point (MPa) | 20.0 | 12.0 | 22.0 | 16.0 | 4.0 | 2.0 | | 4.7 |
| Elongation at breaking point (%) | 500 | 400 | 400 | 250 | 80 | 30 | | 144 |
| Durability: Mechanical property after hydrolysis resistance test (70° C., 95% RH, 5 weeks) | | | | | | | | |
| Evaluation of durability: Mechanical property after hydrolysis resistance test | A | A | A | A | A | C | C | A |
| 100% modulus (MPa) | 0.9 | 2.0 | 1.5 | 2.8 | 12.0 | 0.3 | Could not be measured. (Tack was observed.) | 2.2 |
| Stress at breaking point (MPa) | 19.0 | 11.0 | 21.0 | 15.5 | 4.0 | 0.2 | | 4.7 |
| Elongation at breaking point (%) | 480 | 400 | 400 | 230 | 80 | 5 | | 100 |
| Outgas (total VOC): | A | A | A | A | A | A | A | C |
| Property of adhering to base | A | A | A | A | A | C | C | B |
| Rapid curability | C | B | C | B | B | C | C | C |

C. Ex.: Comparative Example

Example 17 to Example 21 and Comparative Example 9 to Comparative Example 11

In Examples 17 to 21 and Comparative Examples 9 to 11, a phenoxy phosphazene (F) or a phosphoric acid ester compound (Comparative Example 11) was mixed.

Evaluation results of the active-energy-ray-curable hot-melt urethane resin compositions (UVHM25) to (UVHM32) and formed parts 25 to 32 are shown in Tables 3 and 4 in accordance with the compositions shown in Tables 3 and 4.

TABLE 3

|  | Example 17 | Example 18 | Example 19 | Example 20 | Example 21 |
|---|---|---|---|---|---|
| Abbreviation of NCO group-terminated urethane prepolymer (C) | (C-1) | (C-1) | (C-1) | (C-1) | (C-1) |
| Polyol component (A) |  |  |  |  |  |
| Aromatic polyester polyol (a1) containing 2,2-dimethyl-1,3-propylene structure in glycol component (part) |  |  |  |  |  |
| NPG/DEG/OPA [Mn = 1000] (a1-1) | 20 | 20 | 20 | 20 | 20 |
| NPG/TPA [Mn = 1000] (a1-2) |  |  |  |  |  |
| Polyol (a2) other than polyol (a1) (part) |  |  |  |  |  |
| PTMG [Mn = 2000] (a2-1) | 80 | 80 | 80 | 80 | 80 |
| MN 700 (a2-2) |  |  |  |  |  |
| Polyisocyanate component (B) |  |  |  |  |  |
| XDI (B-1) | 22.0 | 22.0 | 22.0 | 22.0 | 22.0 |
| MDI (B-2) |  |  |  |  |  |
| Total | 122 | 122 | 122 | 122 | 122 |
| Properties of urethane prepolymer (C) |  |  |  |  |  |
| NCO % | 3.90 | 3.90 | 3.90 | 3.90 | 3.90 |
| Melt viscosity (mPa · s/100° C.) | 1890 | 1890 | 1890 | 1890 | 1890 |
| Softening temperature (° C.) | 35 | 35 | 35 | 35 | 35 |
| Hot-melt urethane (X) having terminal (meth)acryloyl group | (X-1) | (X-3) | (X-3) | (X-3) | (X-3) |
| Reactive functional group-containing (meth)acrylic compound (D) |  |  |  |  |  |
| HEA (D-1) |  |  |  |  |  |
| Ratio of the number of NCO groups reacted with OH groups in (D) [OH in (D)/NCO] × 100 (%) | 55 | 100 | 100 | 100 | 100 |
| Properties of reactive functional group-containing (meth)acrylic compound (D) |  |  |  |  |  |
| Melt viscosity (mPa · s/100° C.) | 1900 | 2010 | 2010 | 2010 | 2010 |
| NCO % | 1.93 | 0.00 | 0.00 | 0.00 | 0.00 |
| Active-energy-ray-curable hot-melt urethane resin composition (UVHM) | 25 | 26 | 27 | 28 | 29 |
| Abbreviation of NCO-terminated urethane prepolymer (C) | (C-1) | (C-3) | (C-3) | (C-3) | (C-3) |
| Ratio of the number of NCO groups reacted with OH groups in reactive functional group-containing (meth)acrylic compound (D) to the total number of NCO groups in prepolymer (C) [OH in (D)/NCO] × 100 (%) | 55 | 100 | 100 | 100 | 100 |
| Amount of urethane prepolymer (C) used (part) | 100 | 100 | 100 | 100 | 100 |
| Terminal acryloyl group-containing curable hot-melt urethane (X) | (X-1) | (X-3) | (X-3) | (X-3) | (X-3) |
| Active energy ray polymerization initiator (Y) (part) |  |  |  |  |  |
| Irgacure 651 (Y-1) | 2 | 2 | 2 | 2 |  |
| Peroyl TCP (Y-2) |  |  |  |  | 2 |
| Porous silica (E) (part) |  |  |  |  |  |
| Sylysia 350 (E-1) |  |  |  |  |  |
| Phenoxy phosphazene (F) (part) |  |  |  |  |  |
| Rabitle FP-110 (F-1) | 20 | 20 | 15 | 40 | 20 |
| Evaluation results |  |  |  |  |  |
| Formed part No. | 25 | 26 | 27 | 28 | 29 |
| Coating workability at 100° C.: | A | A | A | A | A |
| Shape-retaining property after being applied: | A | A | A | A | A |
| Flexibility: | A | A | A | A | A |

TABLE 3-continued

|  | Example 17 | Example 18 | Example 19 | Example 20 | Example 21 |
|---|---|---|---|---|---|
| Mechanical property in ordinary state |  |  |  |  |  |
| 100% modulus (MPa) | 1.8 | 4.0 | 4.5 | 3.5 | 5.0 |
| Stress at breaking point (MPa) | 9.0 | 11.0 | 12.0 | 10.5 | 12.0 |
| Elongation at breaking point (%) | 280 | 220 | 200 | 240 | 200 |
| Durability: Mechanical property after hydrolysis resistance test (70° C., 95% RH, 5 weeks) |  |  |  |  |  |
| Evaluation of durability: | A | A | A | A | A |
| Mechanical property after hydrolysis resistance test |  |  |  |  |  |
| 100% modulus (MPa) | 1.8 | 4.0 | 4.5 | 3.4 | 4.8 |
| Stress at breaking point (MPa) | 9.0 | 11.0 | 12.0 | 10.0 | 11.0 |
| Elongation at breaking point (%) | 290 | 220 | 200 | 240 | 210 |
| Outgas (total VOC): | A | A | A | A | A |
| Property of adhering to base | A | A | A | A | A |
| Rapid curability | A | A | A | A | A |
| Flame retardancy (UL94 standard) | V-0 | V-0 | V-0 | V-0 | V-0 |

TABLE 4

|  | C. Ex. 9 | C. Ex. 10 | C. Ex. 11 |
|---|---|---|---|
| Abbreviation of NCO-terminated urethane prepolymer (C) | (C-9) | (C-9) | (C-9) |
| Polyol component (A) |  |  |  |
| Aromatic polyester polyol (a1) containing 2,2-dimethyl-1,3-propylene structure in glycol component (part) |  |  |  |
| NPG/DEG/OPA [Mn = 1000] (a1-1) | 20 | 20 | 20 |
| NPG/TPA [Mn = 1000] (a1-2) |  |  |  |
| Polyol (a2) other than polyol (a1) (part) |  |  |  |
| PTMG [Mn = 2000] (a2-1) | 80 | 80 | 80 |
| DEG/OPA [Mn = 1000] (a2-3) |  |  |  |
| PPG [Mn = 2000] (a2-4) |  |  |  |
| Polyisocyanate component (B) |  |  |  |
| XDI (B-1) | 22.0 | 22.0 | 22.0 |
| MDI (B-2) |  |  |  |
| 2-Ethyl-2-butylpropanediol diacrylate |  |  |  |
| Isononyl acrylate |  |  |  |
| SIBSAR 072T |  |  |  |
| Aerosil 200 |  |  |  |
| Total | 122 | 122 | 122 |
| Properties of urethane prepolymer (C) |  |  |  |
| NCO % | 3.91 | 3.91 | 3.91 |
| Melt viscosity (mPa · s/100° C.) | 1890 | 1890 | 1890 |
| Softening temperature (° C.) | 35 | 35 | 35 |
| Hot-melt urethane (X) having terminal (meth)acryloyl group | (X-15) | (X-15) | (X-15) |
| Reactive functional group-containing (meth)acrylic compound (D) |  |  |  |
| HEA (D-1) |  |  |  |
| Ratio of the number of NCO groups reacted with OH groups in (D) [OH in (D)/NCO] × 100 (%) | 40 | 40 | 40 |
| Properties of reactive functional group-containing (meth)acrylic compound (D) |  |  |  |
| Melt viscosity (mPa · s/100° C.) | 2100 | 2100 | 2100 |
| NCO % | 2.30 | 2.30 | 2.30 |
| Active-energy-ray-curable hot-melt urethane resin composition (UVHM) | 30 | 31 | 32 |
| Abbreviation of NCO-terminated urethane prepolymer (C) | (C-9) | (C-9) | (C-9) |
| Ratio of the number of NCO groups reacted with OH groups in reactive functional group-containing (meth)-acrylic compound (D) to the total number of NCO groups in prepolymer (C) [OH in (D)/NCO] × 100 (%) |  |  |  |
| Amount of urethane prepolymer (C) used (part) | 100 | 100 | 100 |
| Terminal acryloyl group-containing curable hot-melt urethane (X) | (X-15) | (X-15) | (X-15) |
| Active energy ray polymerization initiator (Y) (part) |  |  |  |
| Irgacure 651 (Y-1) | 2 | 2 | 2 |
| Peroyl TCP (Y-2) |  |  |  |
| Porous silica (E) (part) |  |  |  |
| Sylysia 350 (E-1) |  |  |  |
| Phenoxy phosphazene (F) (part) |  |  |  |
| Rabitle FP-110 (F-1) | 10 | 50 |  |
| Phosphoric acid ester compound (part) |  |  | 20 |
| Reofos PX-200 |  |  |  |
| Evaluation results |  |  |  |
| Formed part No. | 30 | 31 | 32 |
| Coating workability at 100° C.: | A | A | A |
| Shape-retaining property after being applied: | C | A | C |
| Flexibility: | A | A | A |
| Mechanical property in ordinary state |  |  |  |
| 100% modulus (MPa) | 1.5 | 1.0 | 1.8 |
| Stress at breaking point (MPa) | 10.0 | 8.0 | 10.0 |
| Elongation at breaking point (%) | 350 | 250 | 380 |
| Durability: Mechanical property after hydrolysis resistance test (70° C., 95% RH, 5 weeks) |  |  | Bleeding |
| Evaluation of durability: | A | A | C |
| Mechanical property after hydrolysis resistance test |  |  |  |
| 100% modulus (MPa) | 1.2 | 0.9 | 1.0 |
| Stress at breaking point (MPa) | 8.0 | 6.0 | 5.0 |
| Elongation at breaking point (%) | 340 | 220 | 120 |
| Outgas (total VOC): | A | A | A |
| Property of adhering to base | C | C | C |

TABLE 4-continued

|  | C. Ex. 9 | C. Ex. 10 | C. Ex. 11 |
|---|---|---|---|
| Rapid curability | B | B | B |
| Flame retardancy (UL94 standard) | V-2 | V-0 | V-2 |

C. Ex.: Comparative Example

Abbreviations described in Tables 1 to 4 represent the compounds below.
NPG: neopentyl glycol
DEG: diethylene glycol
OPA: phthalic anhydride
TPA: terephthalic acid
PTMG: polytetramethylene glycol
Actcol MN700: trade name, trifunctional propylene glycol (molecular weight 700, manufactured by Mitsui Chemicals, Inc.)
SEBA: sebacic acid
IPA: isophthalic acid
XDI: xylylene diisocyanate
MDI: 4,4'-diphenylmethane diisocyanate
HEA: 2-hydroxyethyl acrylate
4HBA: 4-hydroxybutyl acrylate
HEMA: 2-hydroxyethyl methacrylate
PPG: propylene glycol
SIBSAR 072T: trade name, manufactured by Kaneka Corporation, styrene-isobutylene-styrene copolymer having a triblock structure, styrene content: 23% by mass
Peroyl TCP: trade name, manufactured by NOF Corporation
Aerosil 200: trade name, manufactured by Nippon Aerosil Co., Ltd., non-surface-treated fumed silica
Irgacure 651: trade name, manufactured by Ciba Specialty Chemicals Inc.
Sylysia 350: trade name, manufactured by Fuji Silysia Chemical Ltd.
Reofos PX-200: trade name, manufactured by Daihachi Chemical Industry Co., Ltd.
Rabitle FP-100: trade name, manufactured by Fushimi Pharmaceutical Co., Ltd., cyclic phenoxy phosphazene compound

INDUSTRIAL APPLICABILITY

The active-energy-ray-curable hot-melt urethane resin composition of the present invention has two properties, namely, a hot-melt property of solidification by cooling after application being fast and rapid curability upon irradiation with active energy rays such as ultraviolet rays, electron beams, X-rays, infrared rays, or visible rays, and has excellent properties such as a shape-retaining property after being applied onto a base, flexibility, durability (in particular, hydrolysis resistance), a property of adhering to a base (in particular, a property of adhering to a metal), a low outgas property, mechanical strength, and flame retardancy. Accordingly, the active-energy-ray-curable hot-melt urethane resin composition of the present invention is useful in a wide range of applications, for example, not only members for an electronic device, such as packing (various types of packing, e.g., packing for an electronic device, packing for an industrial member, packing for a hard disk drive, and packing for a housing case), cap sealing members, and fixing members (for example, a fixing member for a magnetic head and a fixing member between a substrate and a connector) but also sealing members, films, sheets, packing for industrial use, ribbons, adhesives (e.g., an adhesive for building materials and an adhesive for fibers), coating agents, and pressure-sensitive adhesives.

The invention claimed is:

1. An active-energy-ray-curable hot-melt urethane resin composition consisting essentially of a hot-melt urethane (X); and an active energy ray polymerization initiator (Y), the hot-melt urethane (X) being obtained by converting more than 50% and 100% or less of the total number of isocyanate groups in an isocyanate group-terminated urethane prepolymer (C) into terminal (meth)acryloyl groups by a reaction with hydroxyl groups in a reactive functional group-containing (meth)acrylic compound (D), the isocyanate group-terminated urethane prepolymer (C) being obtained by reacting a polyisocyanate component (B) with a polyol component (A) that contains an aromatic polyester polyol (a1) containing, as a glycol having a 2,2-dimethyl-1,3-propylene structure in its molecule, neopentyl glycol in an amount of 90% by mole or more of a glycol component and a polyol (a2) other than the aromatic polyester polyol (a1); wherein the polyol (a2) other than the aromatic polyester polyol (a1) is polytetramethylene glycol.

2. The active-energy-ray-curable hot-melt urethane resin composition according to claim 1, wherein the aromatic polyester polyol (a1) is obtained by a condensation reaction between the glycol component and an aromatic carboxylic acid component, and the aromatic carboxylic acid component contains at least one selected from the group consisting of phthalic acid, phthalic anhydride, isophthalic acid, and terephthalic acid in an amount of 90% by mole or more.

3. The active-energy-ray-curable hot-melt urethane resin composition according to claim 1, wherein the polyol component (A) contains 20 to 70 parts by mass of the aromatic polyester polyol (a1) and 80 to 30 parts by mass of the polyol (a2) other than the aromatic polyester polyol (a1) in 100 parts by mass of the polyol component (A).

4. The active-energy-ray-curable hot-melt urethane resin composition according to claim 1, wherein the urethane prepolymer (C) has a softening temperature in the range of 30° C. to 120° C. measured in accordance with JIS K 2207.

5. The active-energy-ray-curable hot-melt urethane resin composition according to claim 1, further comprising porous silica (E) having an average particle size in the range of 2.0 to 10.0 μm and an oil absorption in the range of 150 to 300 mL per 100 g.

6. The active-energy-ray-curable hot-melt urethane resin composition according to claim 1, further comprising 15 to 40 parts by mass of a phenoxy phosphazene compound (F) relative to 100 parts by mass of the urethane prepolymer (C).

7. The active-energy-ray-curable hot-melt urethane resin composition according to claim 6, wherein the phenoxy phosphazene compound (F) has a melting point in the range of 80° C. to 130° C.

8. A member for an electronic device, the member being produced by forming the active-energy-ray-curable hot-melt urethane resin composition according to any one of claims 1-2 and 3-7.

9. Packing produced by forming the active-energy-ray-curable hot-melt urethane resin composition according to any one of claims 1-2 and 3-7.

* * * * *